(12) United States Patent
Heanue et al.

(10) Patent No.: US 6,212,151 B1
(45) Date of Patent: Apr. 3, 2001

(54) OPTICAL SWITCH WITH COARSE AND FINE DEFLECTORS

(75) Inventors: John F. Heanue; Stephen J. Hrinya; Jerry E. Hurst, Jr., all of San Jose, CA (US)

(73) Assignee: Iolon, Inc., San Jose, CA (US)

( * ) Notice: Subject to any disclaimer, the term of this patent is extended or adjusted under 35 U.S.C. 154(b) by 0 days.

(21) Appl. No.: 09/061,592

(22) Filed: Apr. 16, 1998

Related U.S. Application Data

(60) Provisional application No. 60/065,580, filed on Nov. 12, 1997.

(51) Int. Cl.$^7$ ............................................. G11B 7/00
(52) U.S. Cl. ................... 369/112; 369/44.23; 385/16; 359/298
(58) Field of Search ........................... 369/112, 44.23; 385/16, 23, 19, 22, 15, 17, 20, 24, 25, 31, 88, 18, 83; 359/310, 298

(56) References Cited

U.S. PATENT DOCUMENTS

| | | | |
|---|---|---|---|
| 4,239,330 | 12/1980 | Ashkin et al. | 350/96.18 |
| 4,265,513 | 5/1981 | Matsushita et al. | 350/96.2 |
| 4,304,460 | 12/1981 | Tanaka et al. | 350/96.16 |
| 4,470,662 * | 9/1984 | Mumzhiu | 350/96.15 |
| 4,498,730 | 2/1985 | Tanaka et al. | 350/96.16 |
| 4,626,066 * | 12/1986 | Levinson | 350/96.18 |
| 4,696,062 | 9/1987 | LaBudde | 455/612 |
| 4,896,937 | 1/1990 | Kraetsch et al. | 350/96.2 |
| 4,978,190 | 12/1990 | Veith | 350/96.18 |
| 5,000,532 | 3/1991 | Kraetsch et al. | 350/96.2 |
| 5,024,500 | 6/1991 | Stanley et al. | 350/96.15 |
| 5,159,408 | 10/1992 | Waldenmaier et al. | 356/357 |
| 5,208,880 | 5/1993 | Riza et al. | 385/18 |
| 5,260,928 | 11/1993 | Lee et al. | 369/112 |
| 5,272,690 | 12/1993 | Bargerhuff et al. | 369/112 |
| 5,311,410 * | 5/1994 | Hsu et al. | 385/16 |
| 5,319,629 | 6/1994 | Henshaw et al. | 369/103 |
| 5,424,831 * | 6/1995 | Kossat et al. | 356/73.1 |
| 5,446,811 | 8/1995 | Field et al. | 385/23 |
| 5,452,283 | 9/1995 | Lee et al. | 369/112 |
| 5,483,608 * | 1/1996 | Yokomachi et al. | 385/22 |
| 5,493,440 | 2/1996 | Souda et al. | 359/341 |
| 5,532,884 | 7/1996 | Lee et al . | 359/833 |
| 5,647,033 | 7/1997 | Laughlin | 385/16 |
| 5,677,903 | 10/1997 | Holtslag et al. | 369/112 |
| 5,850,375 * | 12/1998 | Wilde et al. | 369/14 |
| 5,872,880 * | 2/1999 | Maynard | 385/88 |
| 5,903,687 * | 5/1999 | Young et al. | 385/17 |
| 5,923,798 * | 7/1999 | Aksyuk et al. | 383/19 |
| 5,974,019 * | 10/1999 | Belser et al. | 369/112 |

FOREIGN PATENT DOCUMENTS

| | | |
|---|---|---|
| 296 18 818 U1 | 1/1997 | (DE) . |
| 0 369 735 | 5/1990 | (EP) . |
| 0 613 127 A1 | 8/1994 | (EP) . |
| 6310402 | 4/1994 | (JP) . |

OTHER PUBLICATIONS

"Micromachined 1×2 Optical Fiber Switch", L. Field, D. Burriesci, P. Robrish, R. Ruby, *Transducers '95,* Jun. 25–29, 1995, pp. 344–347.

\* cited by examiner

*Primary Examiner*—Tan Dinh
*Assistant Examiner*—Kim-Kwok Chu
(74) *Attorney, Agent, or Firm*—Flehr Hohbach Test Albritton & Herbert LLP

(57) ABSTRACT

Optical switching of light is effected between an input and an output utilizing a low-bandwidth actuator and a hi-bandwidth actuator.

21 Claims, 22 Drawing Sheets

SIMPLIFIED SCHEMATIC OF MIRROR CONTROL ELECTRONICS

OPTICAL SWITCH WITH COARSE AND FINE DEFLECTORS

PRIORITY INFORMATION

The present application is related to commonly assigned U.S. patent application Ser. No. 08/851,379, filed on May 5, 1997 and is incorporated herein by reference.

The present application claims priority from U.S. Provisional Application 60/065,580, filed on Nov. 12, 1997 and is incorporated herein by reference.

BACKGROUND ART

A number of optical switch technologies are currently used for controlling the optical passage of light. With one technology, electric current is applied to a polymer to create a thermal effect that changes a refractive index of a polymer. As the refractive index changes, a light beam passing through the polymer is selectively routed from an input to an output. Although faster than a comparable mechanical optical switch, the switching time of polymer optical switches is limited significantly by the thermal characteristics of the polymer. Additionally, the optical properties of the light transmitted through the polymer are undesirably affected by the optical characteristics of the polymer.

Another optical switch is disclosed by Leslie A. Field et al., in "The 8$^{th}$ International Conference on Solid-State Sensors and Actuators, and Eurosensors IX, Stockholm, Sweden, Jun. 25–29, 1995." The optical switch is micro-machined in silicon and uses a thermally activated actuator to mechanically move a single send optical fiber relative to two receive optical fibers. Field et al. exhibits relatively slow mechanical movement due to inherent thermal effects. Additionally, Field et al. provides only one degree of optical alignment, resulting in inefficient transfer of light between optical fibers due to slight misalignments.

Another micro-machined optical switch is disclosed by Levinson in U.S. Pat. No. 4,626,066. Levinson uses a cantilevered micro-machined mirror that is electrostatically positioned between a stopped and unstopped position. While Levinson's mirror may deflect light between two optical fibers, as with the aforementioned switch designs, it also is capable of optical alignment in only one dimension.

What is needed is an optical switch that provides fast and precise switching of light between one input and a plurality of outputs, or vice versa.

SUMMARY OF THE INVENTION

The present invention includes an optical switch for deflecting a beam of light between an input and an output. The optical switch comprises a first actuator disposed in an optical path of the beam of light between the input and the output and a second actuator disposed in the optical path of the beam of light between the input and the output. In an exemplary embodiment, the first actuator comprises a low-bandwidth voice coil motor. The first actuator further comprises a rotary arm and a reflector. The reflector is coupled to the arm such that the beam of light is deflected by the mirror towards the second actuator. The optical switch further comprises a position sensing detector. In the preferred embodiment, a position of the beam of light is sensed by the position sensing detector, and the deflection of the beam of light by the first actuator is a function of the sensed position of the beam of light. In an exemplary embodiment, the second actuator comprises a hi-bandwidth two-stage voice coil motor and a directing lens, which two dimensionally deflect the beam of light. The optical switch further comprises a quad detector array. In the preferred embodiment, a position of the beam of light is sensed by the quad detector array, and the two dimensional deflection of the beam of light by the second actuator is a function of the sensed position of the beam of light. In the preferred embodiment, the first and the second actuators individually or in combination selectively deflect the beam of light towards the array of lenses. In the preferred embodiment the second actuator is disposed in the optical path between the array of lenses and the first actuator. In one embodiment, the optical switch is used in an optical storage drive to direct the beam of light towards an optical storage location.

DETAILED DESCRIPTION OF A PREFERRED EMBODIMENT OF THE PRESENT INVENTION

Figure 1:
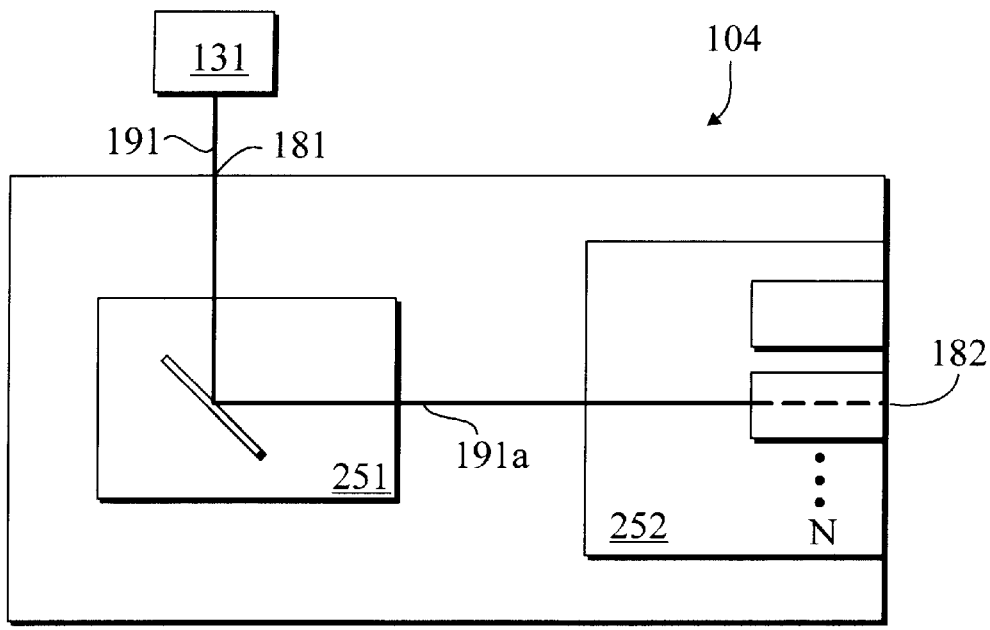
FIGS. 1 and 2 are block diagrams of an optical switch of a storage and retrieval system.
Figure 2:
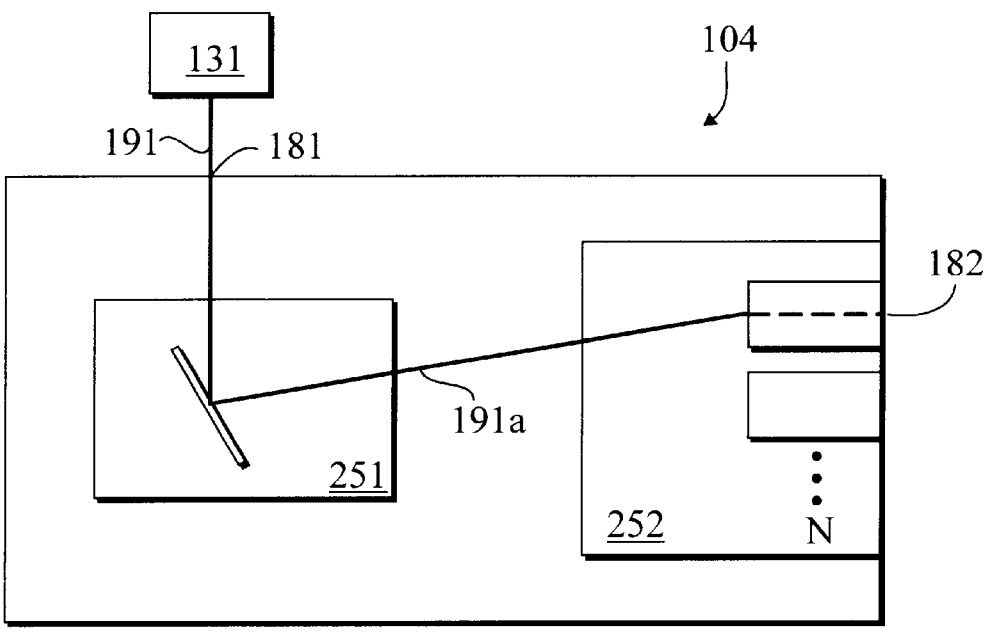

Referring in detail to the drawings wherein similar parts of the invention are identified by like reference numerals, there is seen in FIGS. 1 and 2 a block diagram of an optical switch 104. The optical switch 104 includes an input port 181 and N output ports 182. In the preferred embodiment, an outgoing laser beam 191 from a laser source 131 is directed along an optical path through the input port 181 towards an actuator assembly 251. A portion of the outgoing laser beam 191, which is indicated as a first beam 191a, is routed by the actuator assembly 251 towards an imaging assembly 252 and, subsequently, towards one of the N output ports 182. FIGS. 1 and 2 illustrate the first beam 191a as it is directed by the actuator assembly 251 towards different ones of the N output ports 182. In an exemplary embodiment N equals 12; however, other values for N are understood to be within the scope of the present invention. It is also understood that the while the present invention is described in the context of directing a laser beam between the input port 181 and the output port 182, the optical switch 104 described herein could also be used to direct a laser beam between the output port 182 and the input port 181.

Referring now to FIGS. 3a–3e, the optical switch 104 is illustrated in further detail. In the preferred embodiment, the optical switch 104 further includes a first detector 358 and a second detector 359 (FIG. 3d), and the actuator assembly 251 includes a first actuator 333 and a second actuator 334.

Figure 3A:
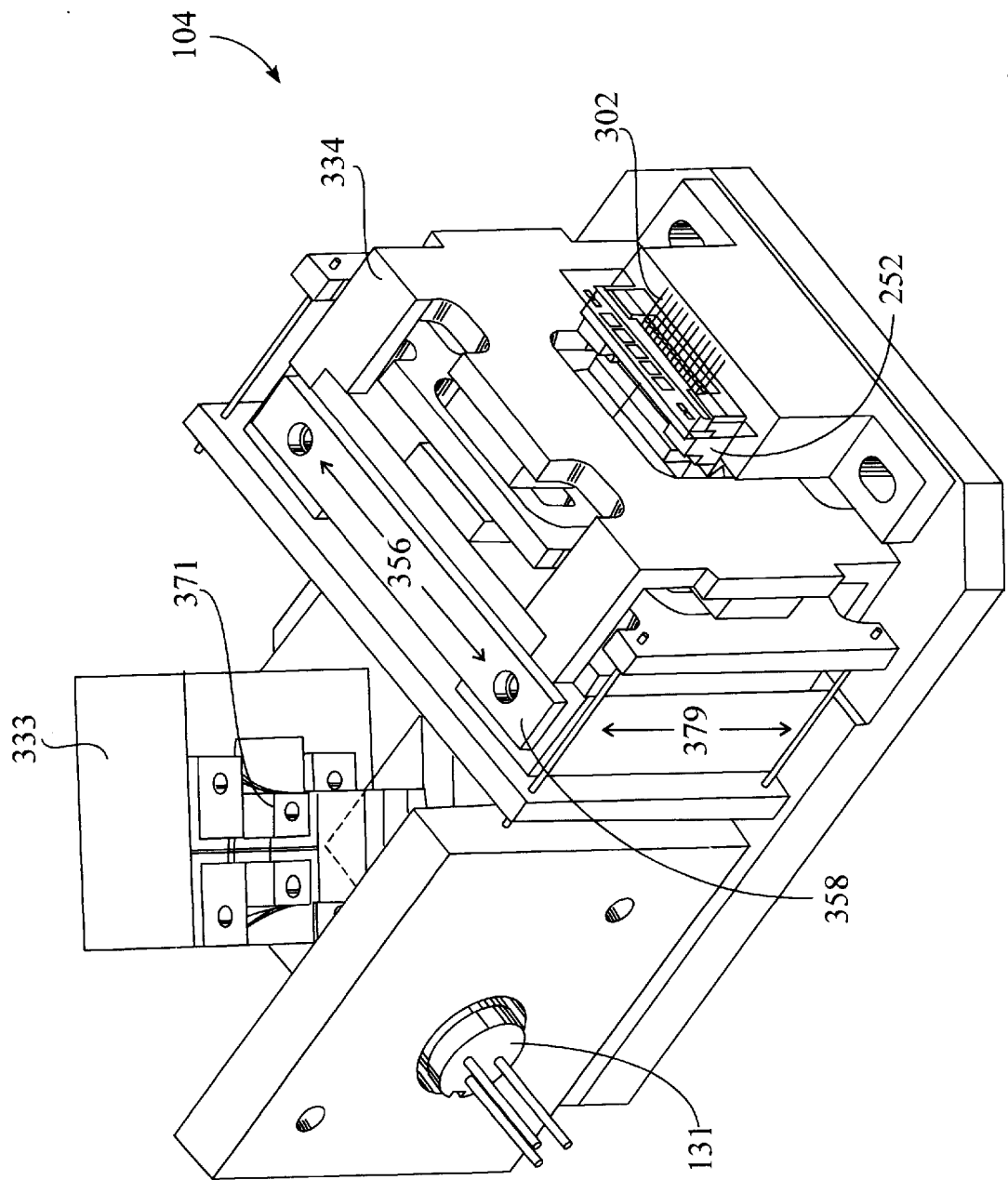
FIGS. 3a–3e, illustrate the optical switch in further detail.
Figure 3B:
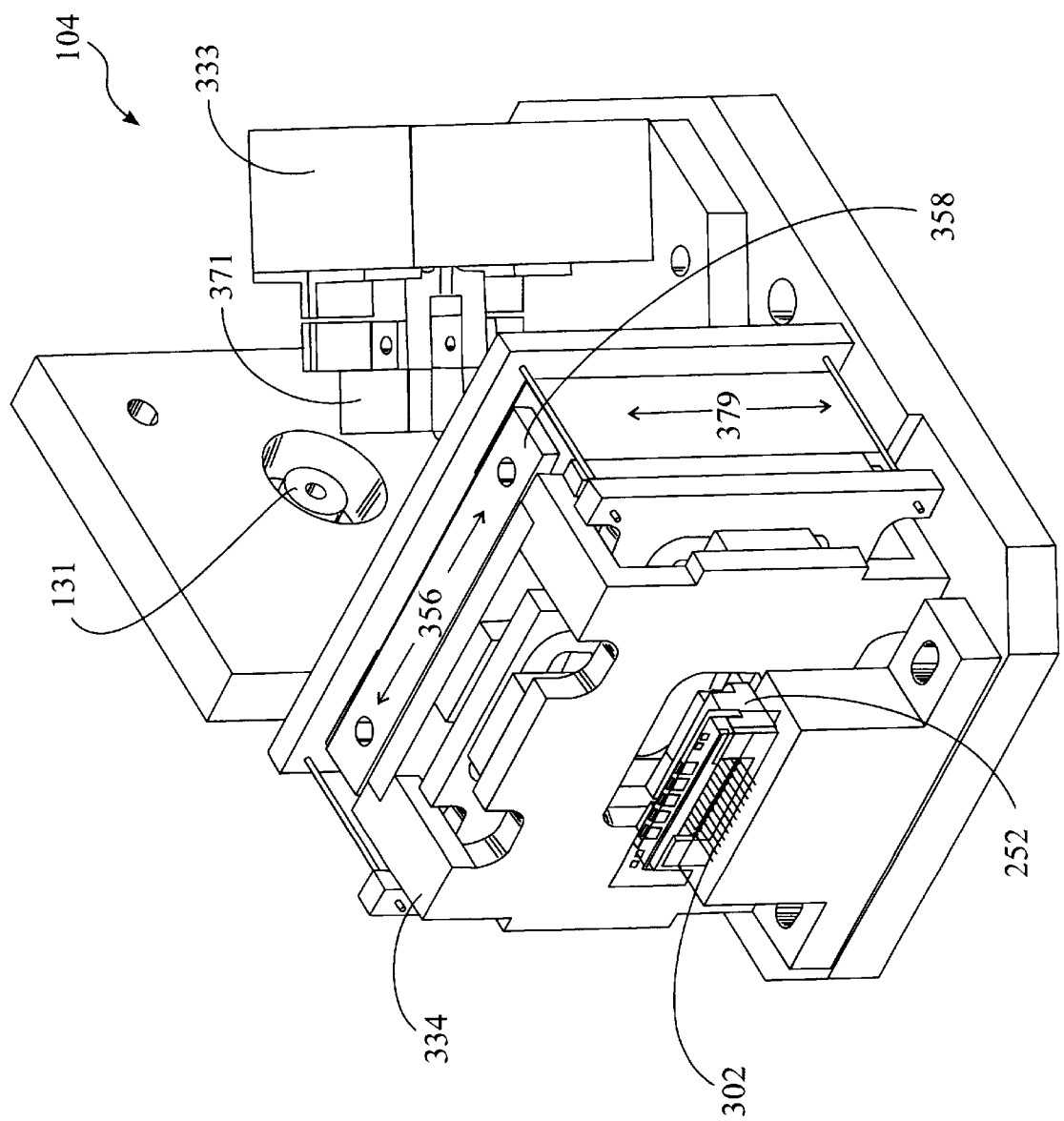
Figure 3C:
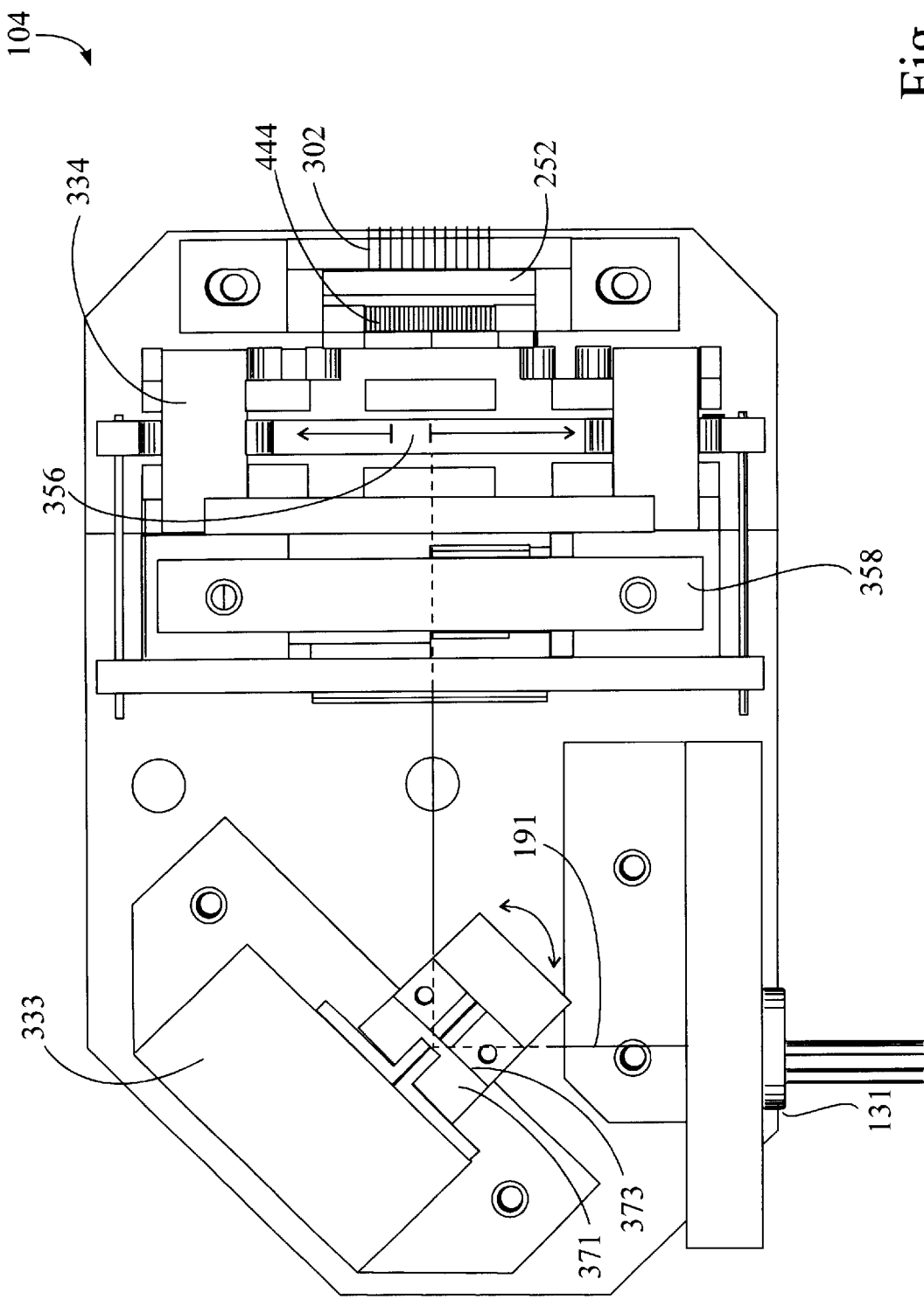
Figure 3D:
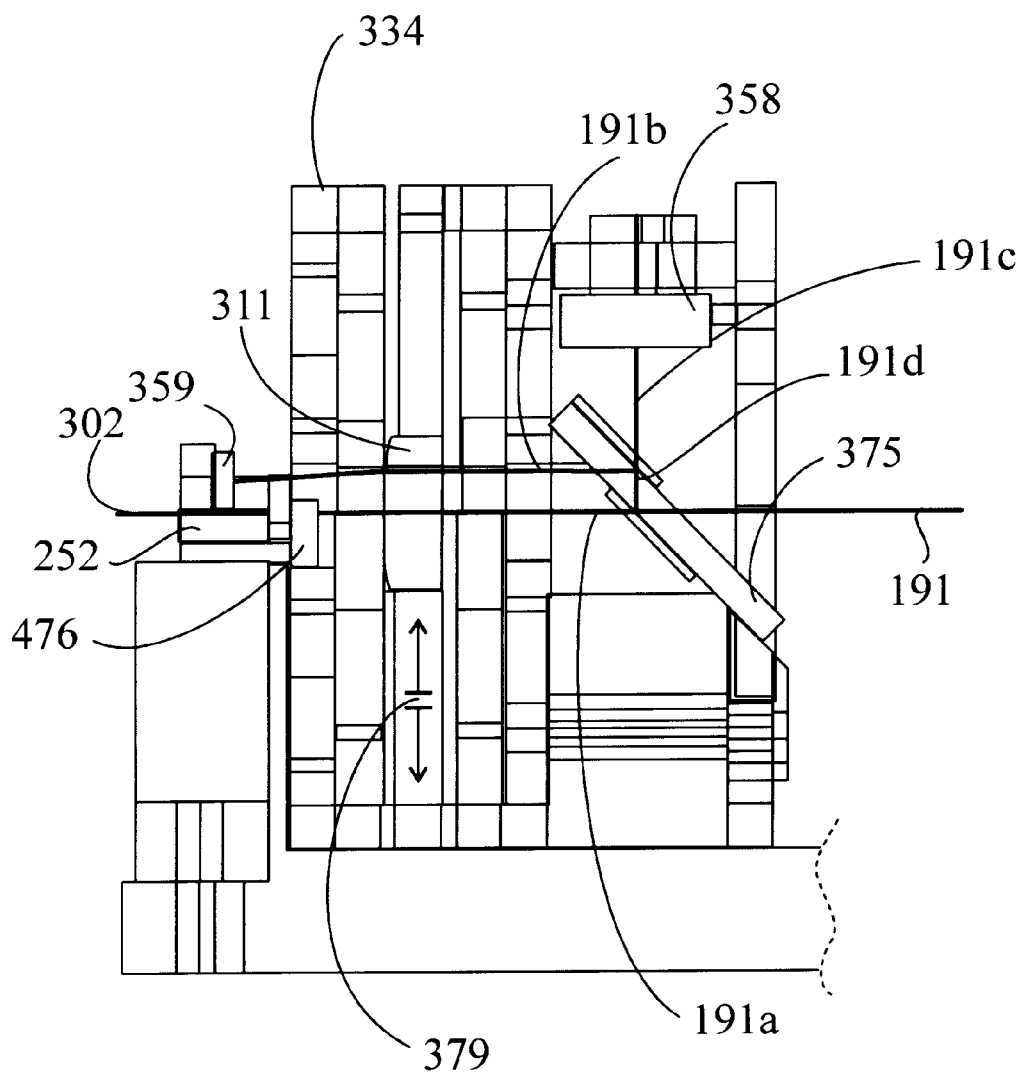
Figure 3E:
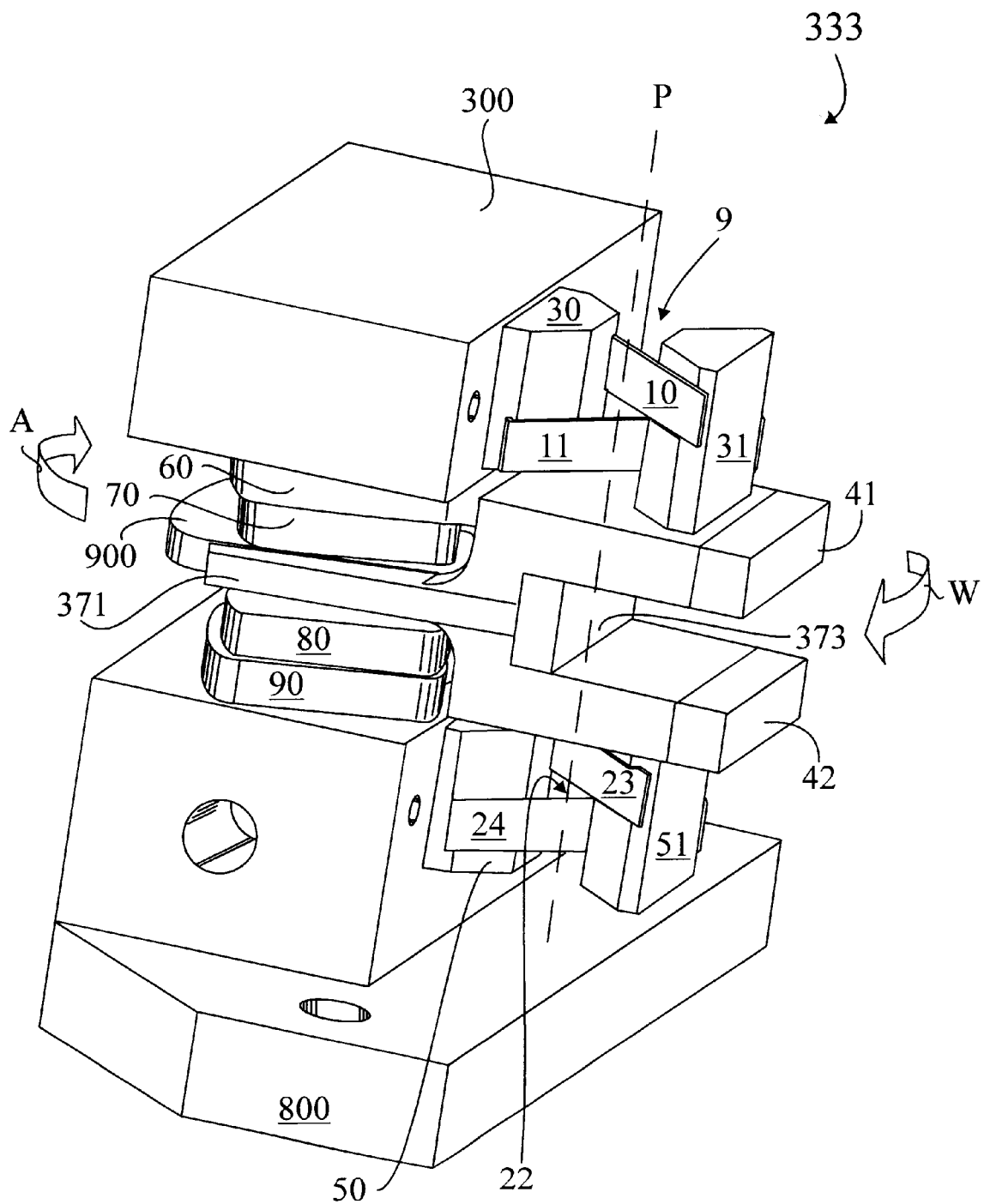

The first and second actuators 333, 334 are both disposed along an optical path between the laser source 131 and a set of optical fibers 302. Referring briefly to FIG. 3e, the first actuator 333 includes a reflector 373 that is coupled to an actuator arm 371. The arm 371 rotates about a pivot axis generally illustrated as P. In the preferred embodiment, the outgoing laser beam 191 is directed by the reflector 373 (FIG. 3c) towards the second actuator 334. In FIG. 3d, the second actuator 334 of the optical switch 104 is illustrated in a side sectional representation. The second actuator 334 includes a directing optics 375 and a redirection lens 311. The outgoing laser beam 191 passes through the directing optics 375 and is optically separated by the directing optics 375 into first, second, and third beams 191a–c, which are respectively directed towards the redirection lens 311, the first detector 358, and the second detector 359.

Figure 4A:
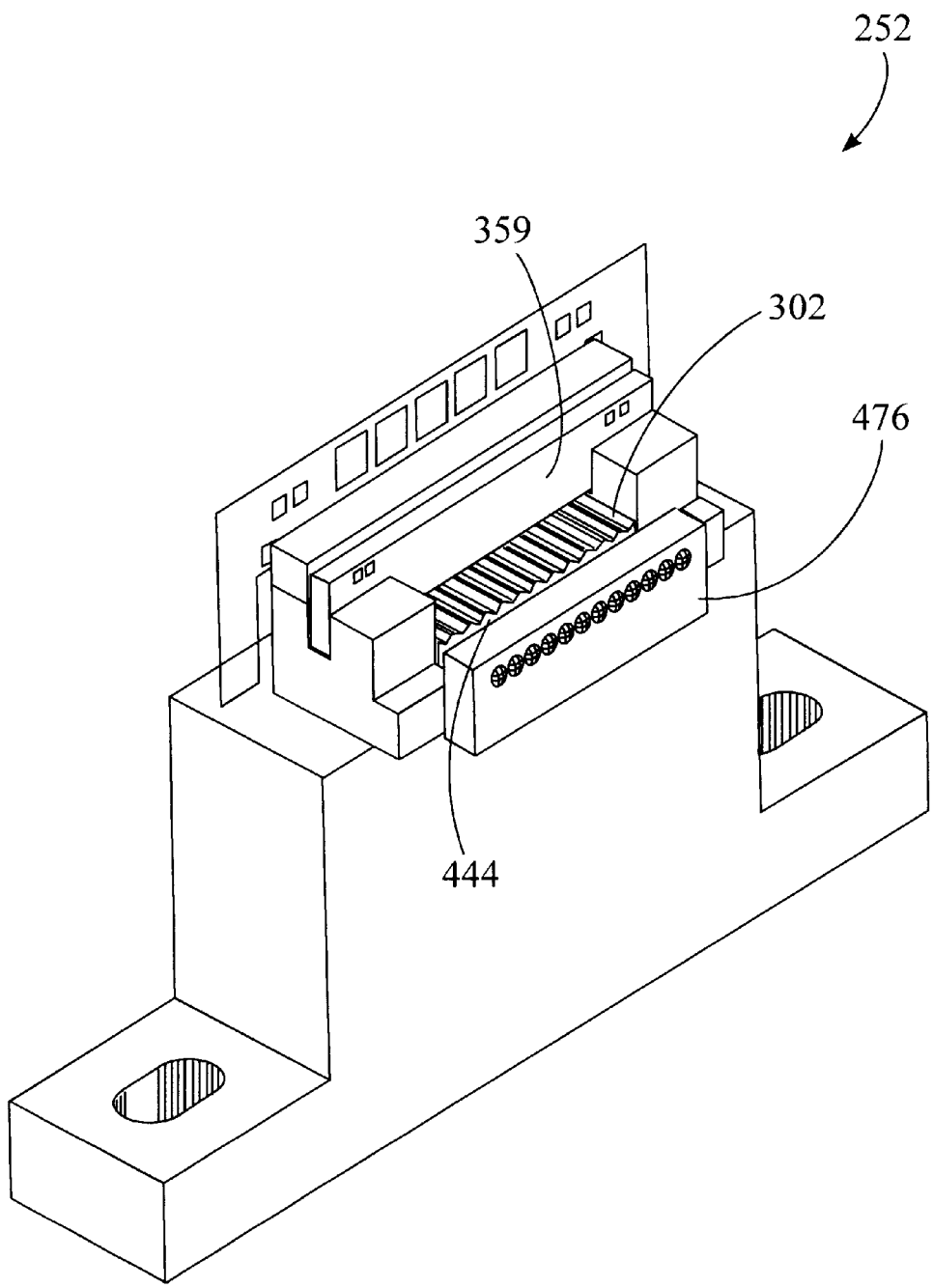
FIGS. 4a–b illustrate an imaging assembly coupled to a set of optical fibers.
Figure 4B:
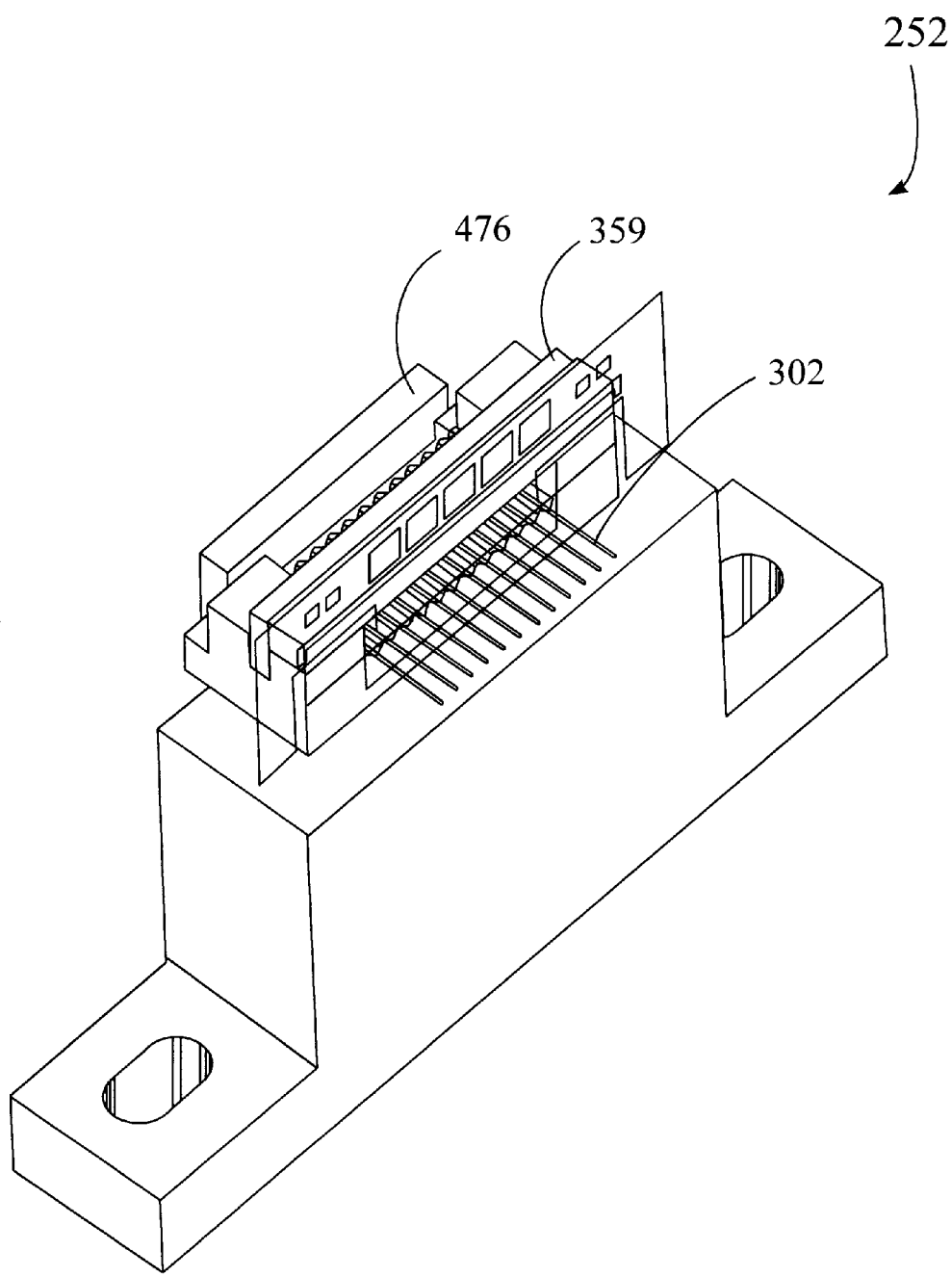

Referring now to FIGS. 4a and 4b, there is seen an imaging assembly coupled to a set of optical fibers. The imaging assembly 252 includes an array of lenses 476 and a set of V-grooves 444. The first beam 191a is directed and focused by the redirection lens 311 onto a particular one of the lenses 476, and the particular lens 476 directs the first beam 191a towards a respective proximal end of one of a set of optical fibers 302. The proximal ends of each of the optical fibers 302 are disposed within the set of V grooves 444. The set of V-grooves 444 and the optical axes of the lenses 476 are aligned such that each of the lenses 476 is focused onto the respective proximal ends of the set of optical fibers 302. In an exemplary embodiment, the lenses 476 are molded plastic lenses that each have a 0.50 mm diameter and are disposed along a linear axis with a 0.50 mm center to center spacing. In the exemplary embodiment, the optical fibers 302 are 4.0 um diameter single-mode polarization maintaining optical fibers, and the polarization axes of the optical fibers 302 are all aligned with respect to each other.

Figure 5:
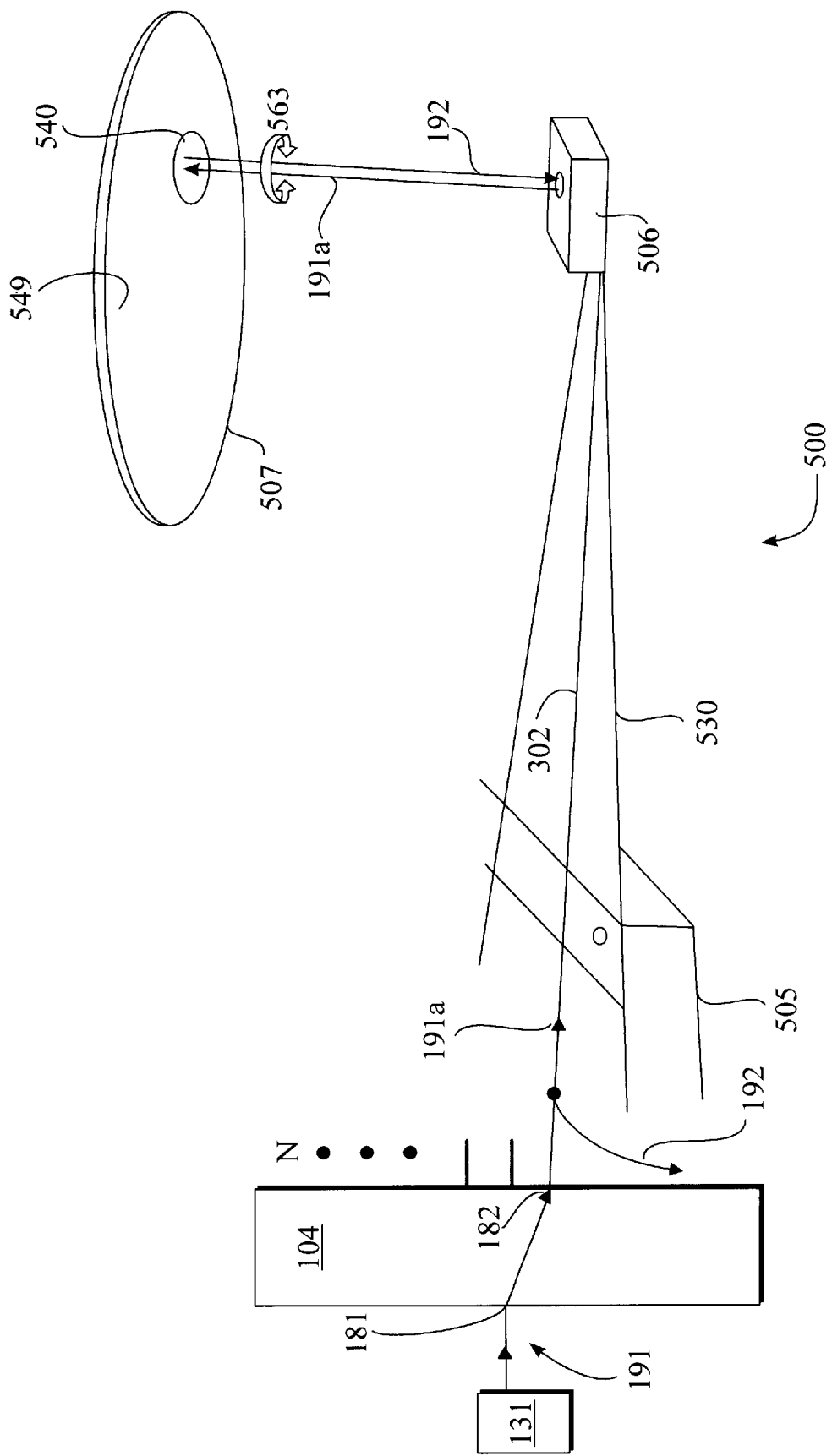
FIG. 5 illustrates the optical switch as used in an exemplary optical path.

Referring now to FIG. 5, there is seen the optical switch as used in an exemplary optical path. In an exemplary embodiment, a magneto-optical (MO) data storage and retrieval system 500 includes a set of Winchester-type flying heads 506 that are adapted for use with a set of double-sided first surface MO disks 507 (only one flying head shown flying over one MO disk surface in FIG. 5). The set of flying heads 506 are coupled to a rotary actuator magnet and coil assembly (not shown) by a respective suspension 530 and actuator arm 505 so as to be positioned over the surfaces of the set of MO disks 507. In operation, the set of MO disks 507 are rotated to generate aerodynamic lift forces, which maintain the set of flying MO heads 506 in a flying condition approximately 15 micro-inches above the upper and lower surfaces of the set of MO disks 507. The lift forces are opposed by equal and opposite spring forces applied by the set of suspensions 530. During non-operation, the set of flying MO heads 506 are maintained statically in a storage condition away from the surfaces of the set of MO disks 507. System 500 further includes: the laser source 131, the optical switch 104, and the set of optical fibers 302. Each of the optical fibers 302 is preferably coupled through a respective one of the set of actuator arms 505 and set of suspensions 530 to a respective one of the set of flying MO heads 506.

In an exemplary embodiment, the laser source 131 operates at a single wavelength, preferably at 635–85 nm within a red region of the visible light spectrum; however, it is understood that laser sources operating at other wavelengths may be used. In the preferred embodiment, the laser source 131 is a distributed feedback (DFB) diode laser source. A DFB laser source 131, unlike an RF-modulated Fabry-Perot diode laser, produces a very narrowband single-frequency output due to the use of a wavelength selective grating element inside the laser cavity. Linearly polarized light from a DFB laser source 131 that is launched into a selected one of the polarization maintaining optical fibers 302 exits the optical fiber with a polarization state that depends on the relative orientation between the fiber axes and the incident polarization. The output polarization state is stable in time as long as external perturbations which alter the fiber birefringence are negligible. This behavior contrasts to that observed when using prior art RF-modulated Fabry-Perot diode laser sources. Fabry-Perot laser diodes are characterized by high-frequency fluctuations in their spectral output; therefore, when linearly polarized light is launched into a polarization maintaining optical fiber 302, fluctuations in the laser wavelength lead to corresponding polarization fluctuations in the laser light exiting the output of the optical fiber. The resulting polarization noise is larger than the corresponding DFB diode laser source case owing to wavelength dependent mode coupling. Mode coupling in fibers is a phenomenon whereby a small portion of the light that is being guided along one polarization axis is coupled into the orthogonal axis by intrinsic or stress-induced defects. In MO recording it is important that the polarization noise be kept to a minimum, such that a signal to noise ration (SNR) in the range of 20–25 dB can be achieved. By using a DFB laser source 131 it is possible to achieve the aforementioned level of SNR in the magneto-optical (MO) data storage and retrieval system 500 when utilizing polarization maintaining optical fiber 302 for the delivery and return of the signal light to and from the MO disks 507.

The representative optical path of FIG. 5 includes: the laser source 131, the optical switch 104, one of the set of optical fibers 302, and one of the set of flying MO heads 506. As described previously, the first beam 191a is directed towards a proximal end of a selected one of the optical fibers 302. The linear polarization of the first beam 191a is preferably aligned in the optical path so as to enter the proximal end of the selected polarization maintaining optical fiber 302 at a 45 degree angle relative to the polarization axis of the optical fiber 302. The first beam 191a is directed by the selected optical fiber 302 to exit a respective distal end of the optical fiber and is further directed by a set of optical elements (as described in commonly assigned U.S. patent application Ser. No. 08/851,379, herein incorporated by reference) located on the flying head 506 towards a surface recording layer 549 of a respective MO disk 507.

During writing of information, the first beam 191a is selectively routed by the optical switch 104 towards a particular MO disk 507 so as to lower a coercivity of the surface recording layer 549 by heating a selected spot of interest 540 to approximately the Curie point of the MO recording layer 549. The optical intensity of the first beam 191a is held constant at a power in a range of 30–40 mw, while a time varying vertical bias magnetic field is used to define a pattern of "up" or "down" magnetic domains perpendicular to the MO disk 507. This technique is known as magnetic field modulation (MFM). Subsequently, as the selected spot of interest 540 cools at the surface layer 549, information is encoded at the surface of the respective spinning disk 507.

During readout of information, the first beam 191a (at a lower power compared to writing) is selectively routed to the MO disk 507 such that at any given spot of interest 540 the Kerr effect causes a reflected laser beam 192 (a reflection of the first beam 191a from the surface layer 549) to have a rotated polarization of either clockwise or counter clockwise sense 563 that depends on the magnetic domain polarity at the spot of interest 540. The reflected laser beam 192 is received by the optical elements on the MO head 506 and is directed by the set of optical elements on the flying head 506 for subsequent electronic conversion and readout.

Figure 6A:
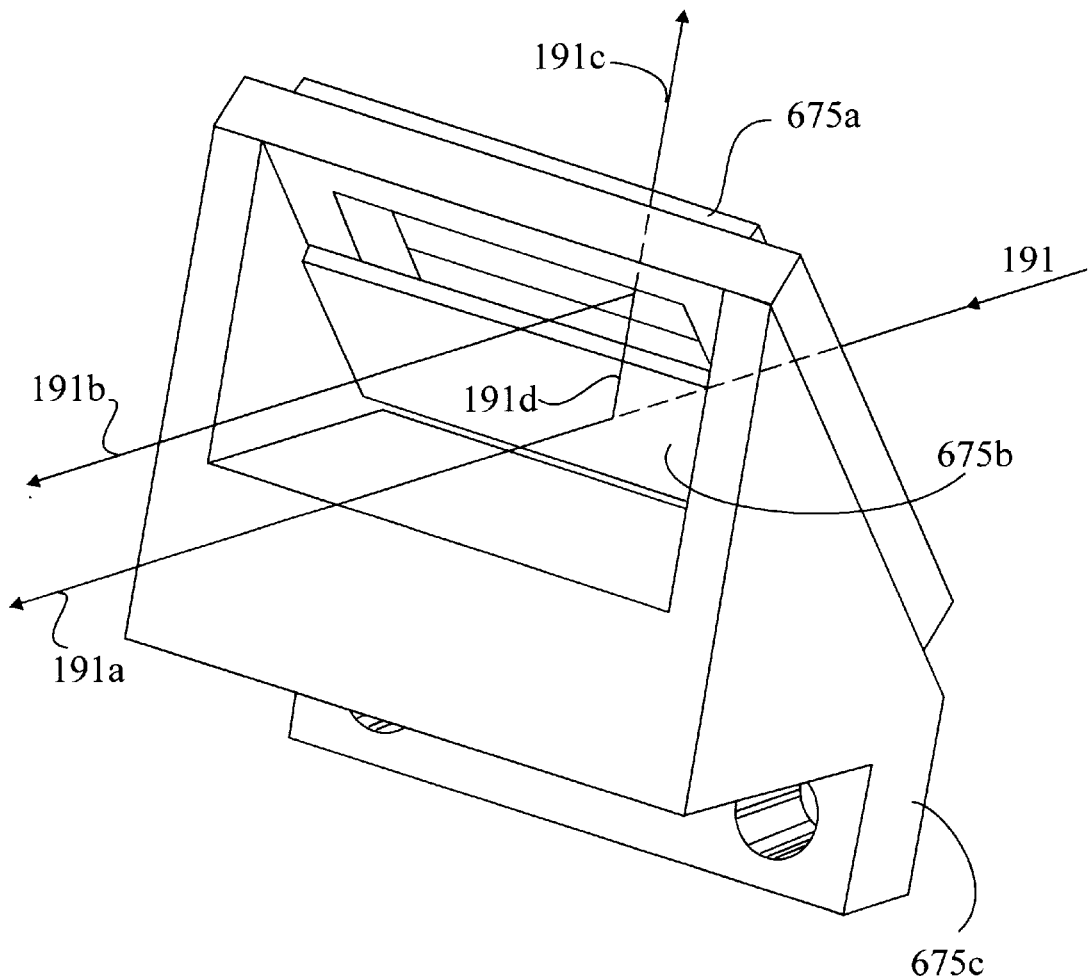
FIGS. 6a–b illustrate a directing optics in further detail.
Figure 6B:
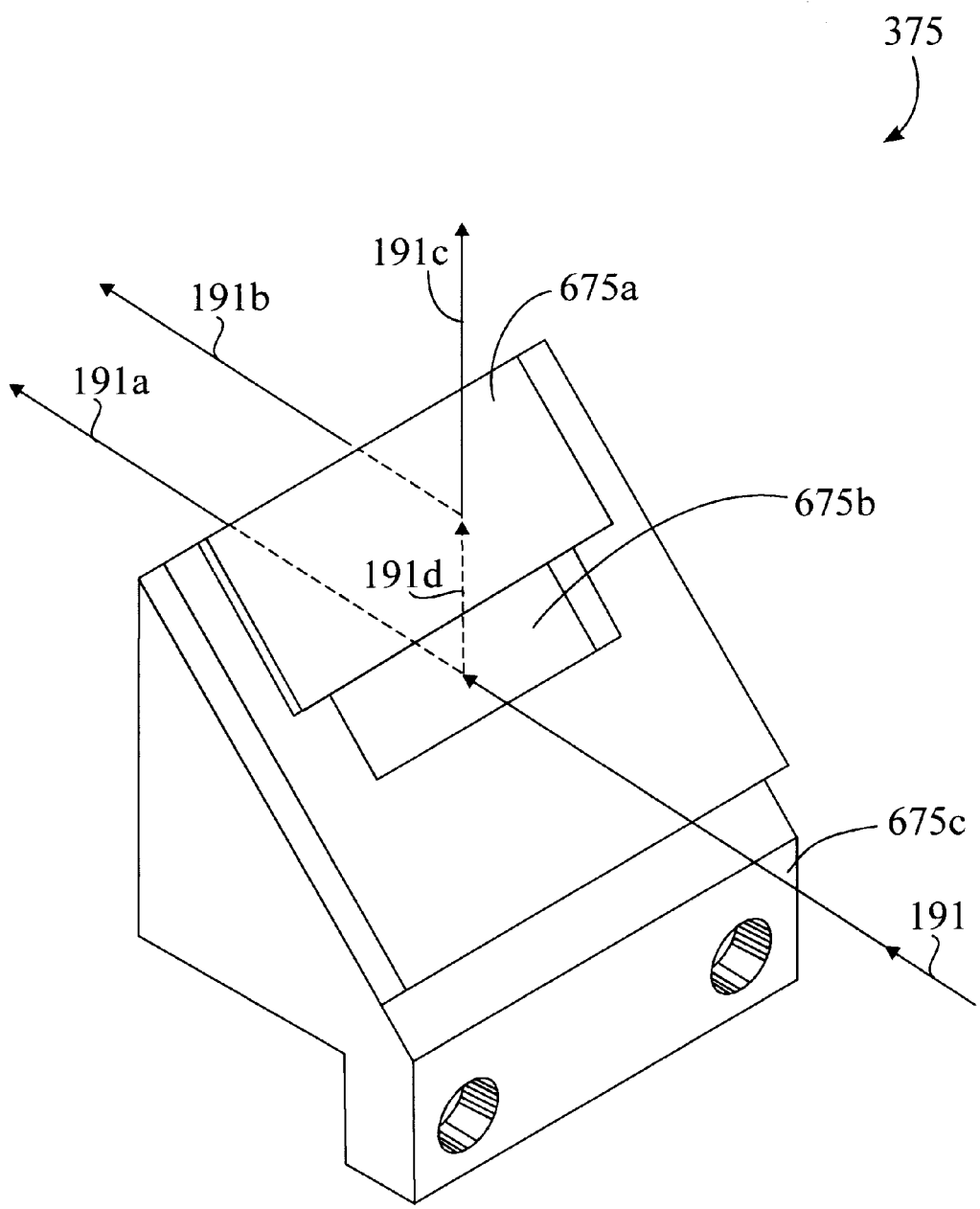

Referring now to FIGS. 6a–6b, the directing optics are illustrated in further detail. The directing optics 375 (FIG. 3d) includes: an upper portion 675a and a lower portion 675b; both are coupled to a mounting portion 675c. In the preferred embodiment, the outgoing laser beam 191 is directed by the first actuator 333 through the lower portion 675b and is optically separated by the lower portion 675b into the first beam 191a and a fourth beam 191d. The lower portion 675b directs the first beam 191a towards the redirection lens 311 generally along or about a central optical axis of the redirection lens 311. The lower portion 675b also directs the fourth beam 191d towards the upper portion 675a. The fourth beam 191d is optically separated by the upper portion 675a into the second beam 191b and the third beam 191c. The second beam 191b is directed by the upper portion 675a towards the redirection lens 311 along an optical axis that is generally parallel to but not co-extensive with the aforementioned central optical axis of the redirection lens 311. The upper portion 675a also directs the third beam 191c towards the first detector 358. Those skilled in the art will recognize that the upper portion 675a and lower portion 675b may comprise beam-splitters of a variety well known in the optical arts. Those skilled in the art will also recognize that in the present invention optical displacement of the outgoing laser beam 191 will result in analogous displacements of the first, second, and third beams 191a–c. The displacements of the first, second, and third beams 191a–c will be utilized to effect an optical switching function as is described in further detail below.

Referring back to FIGS. 3a–e, in an exemplary embodiment, the first actuator 333 comprises a flat voice coil motor assembly (VCM), described in further detail below. In the preferred embodiment, rotation of the arm 371 by the first actuator 333 positions the reflector 373 such that the optical path traversed by the outgoing laser beam 191 is deflected in a plane that is parallel to a linear axis defined by the array of lenses 476. The outgoing laser beam 191 is directed by the reflector 373 through the directing optics 375, towards the redirection lens 311 and the array of lenses 476, and through a particular lens 476 toward a particular proximal end of the optical fibers 302. In an exemplary embodiment, the first actuator 333 operates with an open loop compensated crossover frequency of approximately 0.4 Khz and is capable of approximately 200 g's of acceleration. In the exemplary embodiment, the first actuator 333 rotates the arm 371 about pivot axis P over a +/–3.5 degree range of motion. The following performance characteristics are exhibited by the optical switch 104 using the first actuator 333: 829 um deflection of the first beam 191a across the front surface of a particular lens 476 and 55 um deflection of the first beam 191a across a proximal end of the optical fibers 302 per degree of rotation of the arm 371; and 0.1 um alignment accuracy of the first beam 191a onto a proximal end of the optical fibers 302 per 1.5 um of deflection of the first beam 191a across the array of lenses 476.

Referring now to FIGS. 3e and 7a–e, the first actuator 333 of the present invention is illustrated in further detail. The first actuator 333 includes a set of generally planar assemblies comprising cross-hinges 9 and 22 that are disposed between a set of extended arms 41, 42 and a rigid mounting base 300. The set of hinges 9 and 22 of the present invention replace the pivot and bearing assembly of prior art motors.

In an exemplary embodiment the hinges are used in conjunction with a voice-coil motor ("VCM").

Figure 7A:
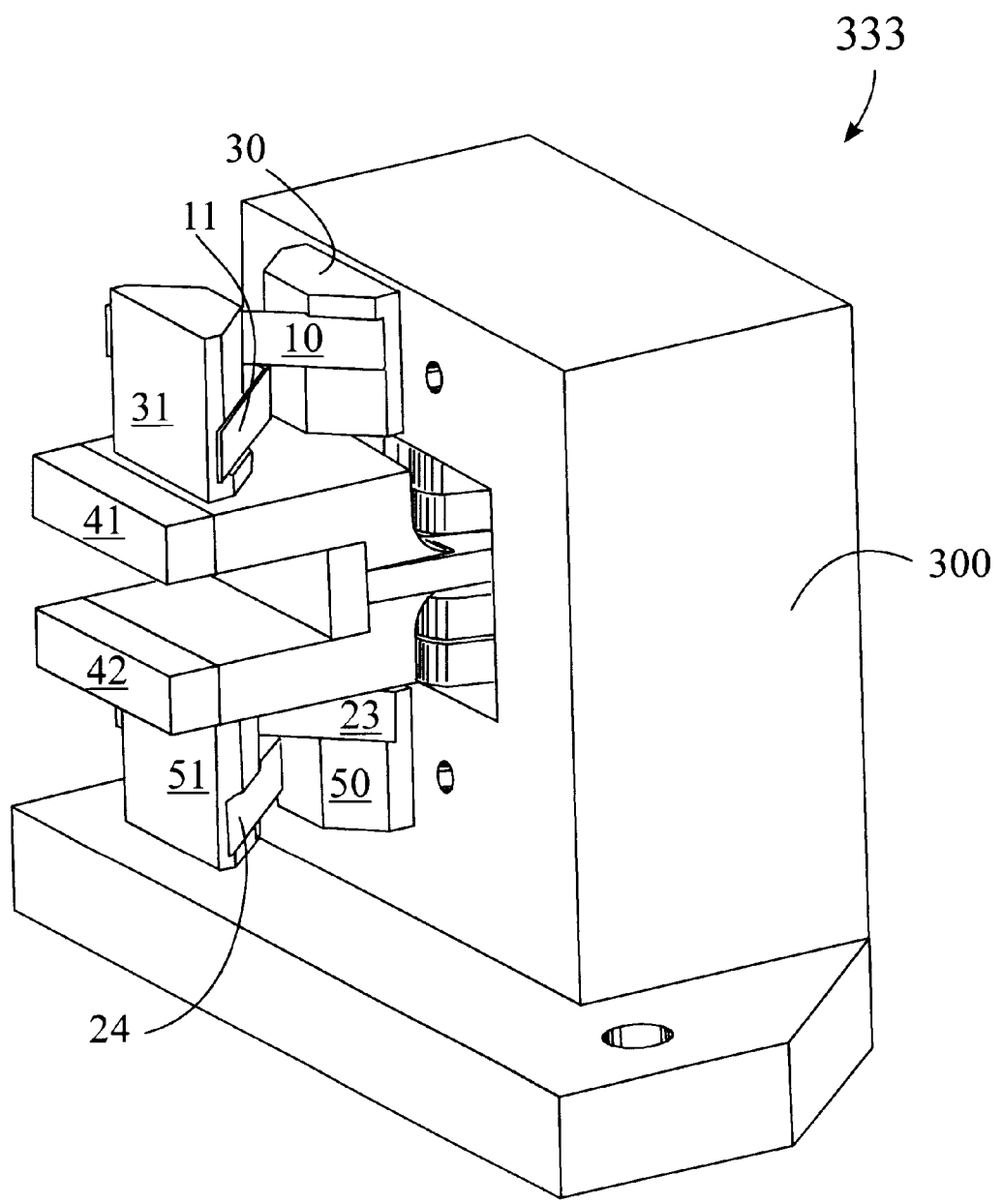
FIGS. 7a–e illustrate a first actuator of the present invention in further detail.

Referring now to FIGS. 3e and 7a, there are seen a perspective view of the first actuator 333 including: a first hinge 10, a second hinge 11, a third hinge 23, and a fourth hinge 24. In the preferred embodiment, the hinges 10, 11, 23, and 24 are shaped as generally planar rectangles, however, as will be understood below, depending on the performance characteristics desired, the hinges 10, 11, 23, and 24 may comprise other shapes, for example, generally planar squares, etc.

Figure 7B:
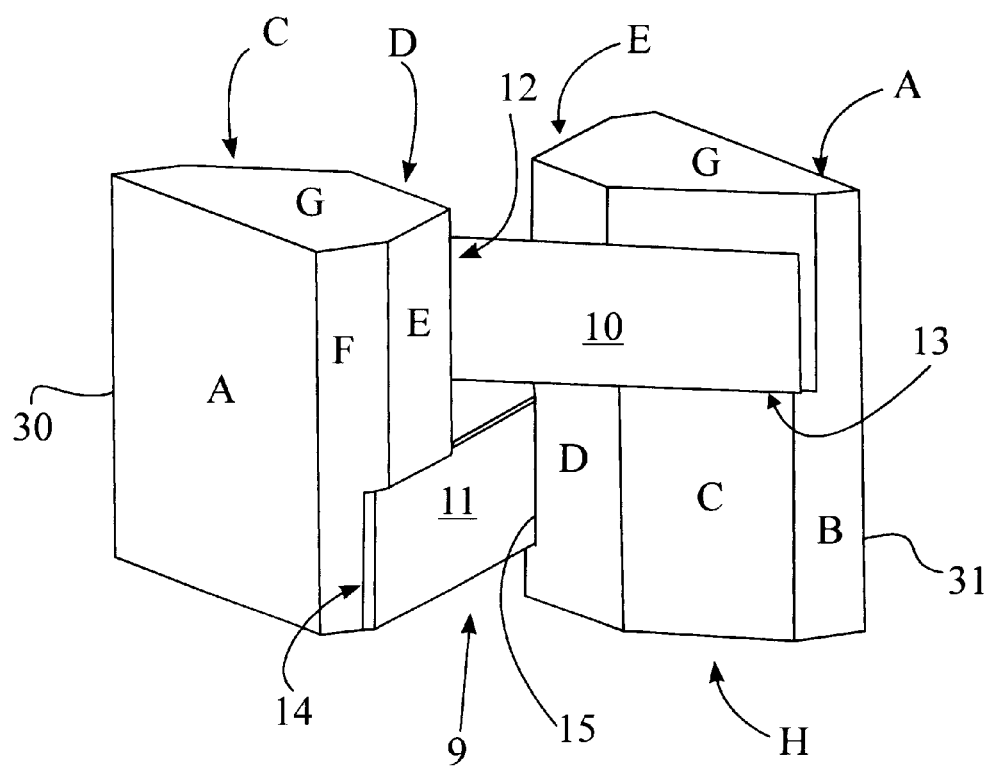

Referring now to FIG. 7b, there is seen a view of the first hinge 10 and the second hinge 11 attached to respective fixed support 30 and movable support 31. First hinge 10 includes a first end 13 that is attached to a notched upper portion of the movable support 31 and a second end 12 that is attached to a notched (notch not visible) upper portion of the fixed support 30. Second hinge 11 includes a first end 15 that is attached to a notched lower portion of the movable support 31 and a second end 14 that is attached to a notched lower portion of the fixed support 30. In the preferred embodiment, attachment of the ends of the hinges 10 and 11 to the supports 30 and 31 may be performed utilizing epoxy or a suitable adhesive; it is understood, however, that other methods of attachment are also within the scope of the present invention, for example, screws, rivets, etc. Hinges 23 and 24 are attached to fixed support 50 and movable support 51 in a similar manner.

Figure 7C:
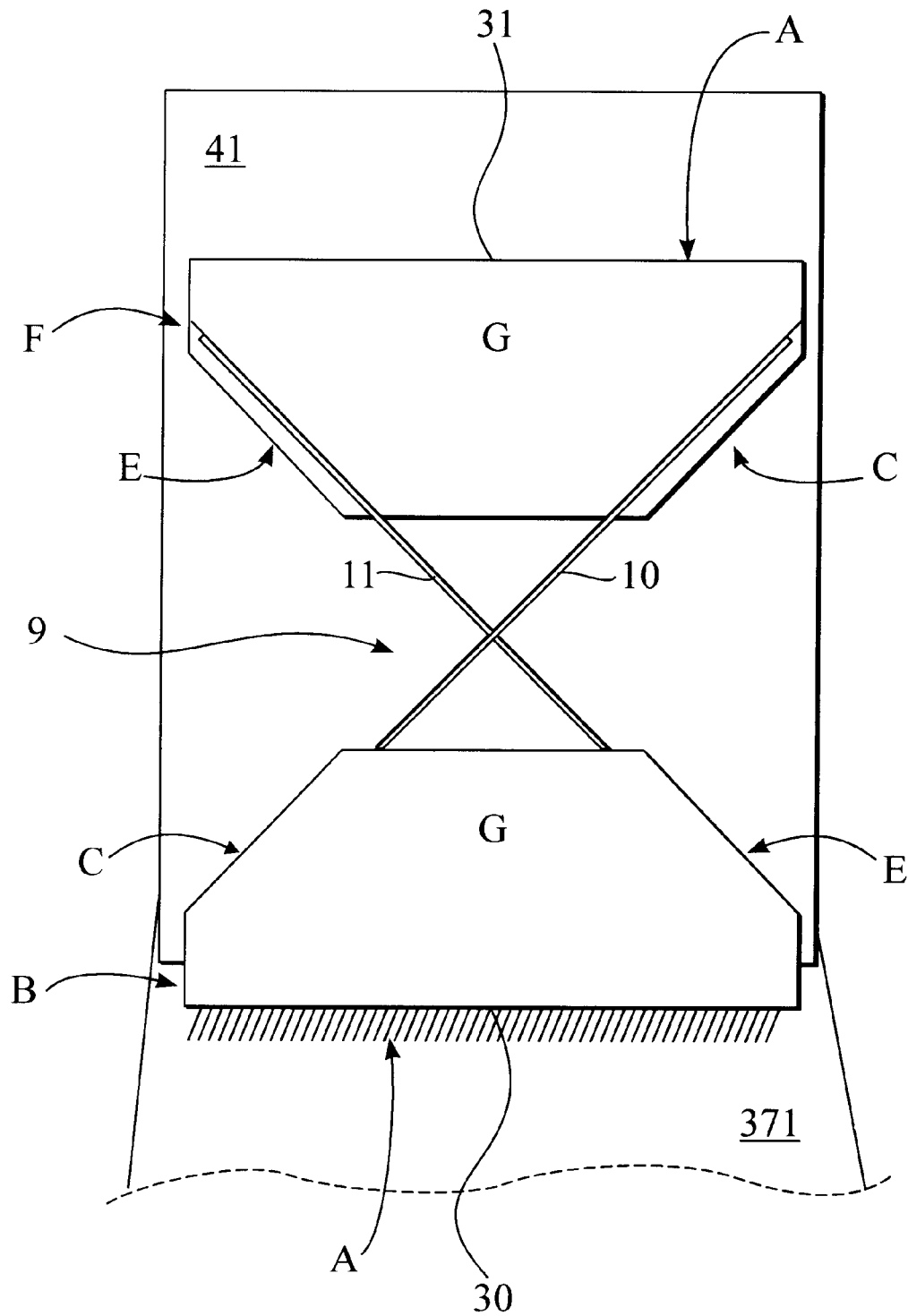

Referring now to FIG. 7c, the first hinge 10 and the second hinge 11 are viewed to comprise an upper pair of cross-hinges 9, which in a top view cross each other in an "X" shaped manner.

Figure 7D:
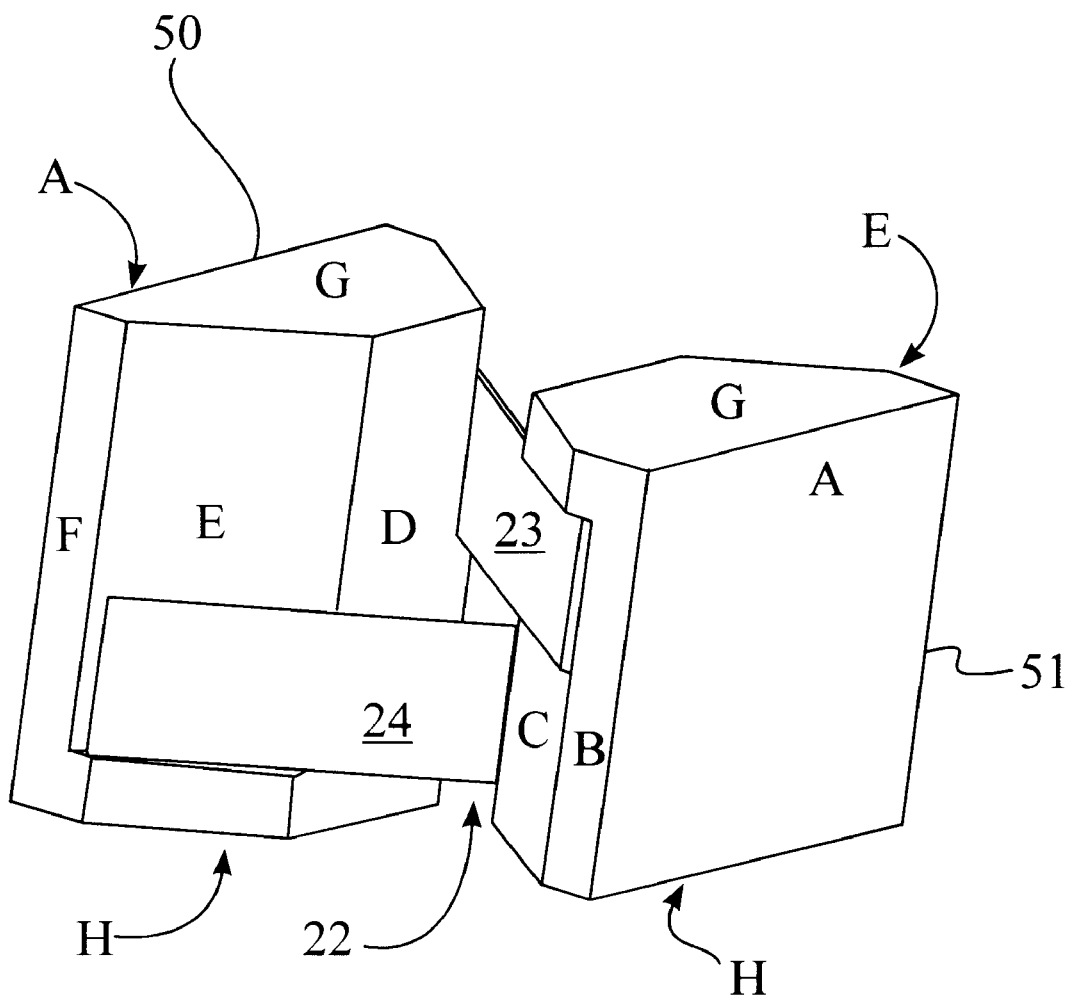

Referring now to FIG. 7d, the third hinge 23 and the fourth hinge 24 are similarly attached to fixed supports 50 and 51 and form a lower pair of cross-hinges 22.

Referring now to both FIG. 3e and FIGS. 7a–d, the movable supports 31 and 51, and the fixed supports 30 and 50 each include eight faces A-H, including a top and bottom face G and H, respectively. The faces A-H of the movable supports 31 and 51 correspond to the faces A-H of the fixed supports 50 and 51, respectively. The face A of the fixed support 30 is attached to an upper side of the rigid mounting base 300. The bottom face H of the movable support 31 is attached to a top surface of an upper extended arm 41. The face A of the fixed support 50 is attached to a lower side of the rigid mounting base 300. The upper face G of the fixed support 51 is attached to an area of a bottom surface of a lower extended arm 42.

Referring back to FIG. 3e and FIG. 7a, the first actuator 333 includes a coil 900 disposed between a first magnet 70 and a first cold-rolled steel block 60, and a second magnet 80 and second cold rolled steel block 90. The coil 900 is attached to the actuator arm 371. The actuator arm 371 connects to two extended arms 41 and 42. The reflector 373 is attached to the coil support 900 between the extended arms 41 and 42. The coil 900 includes an input and an output whereat a current may be applied by a current source (not shown). In an embodiment where supports 30, 31, 50, and 51 are not conductive, the input and output may attach to different ones of the hinges 10, 11, 23, 24. In other embodiments, the input and output may attach to different ones of the supports 30 and 50, or 31 and 51. The input and output may also be attached other points, for example, to a point somewhere in space.

Figure 7E:
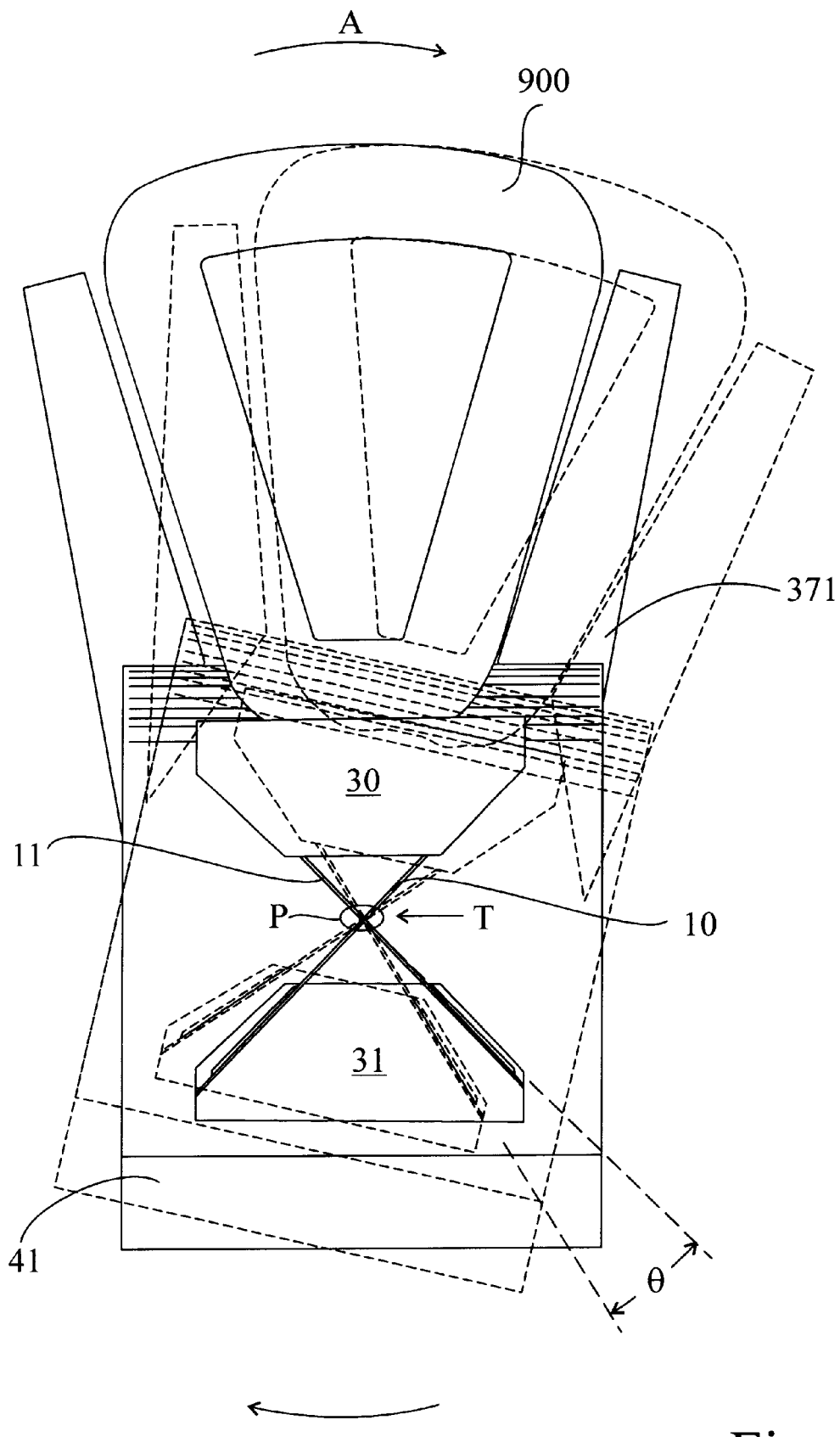

Referring now to FIG. 7e, there is seen a representative top view of a movement of the hinges 10 and 11. In the preferred embodiment, application of a current to the input of the coil 900 creates a magnetic field opposite to the magnetic field of the magnets 70, 80. The opposing magnetic fields create a repulsion force that moves the arm 371 away from the magnets 70, 80 (shown as an exemplary direction A). As discussed below, because the arm 371 is coupled through the extended arm 41 to the movable support 31, when current is applied to the coil 900, the movable support 31 will also move (shown as an exemplary direction W).

With reference to cross hinges 9, because the first ends 13 and 15 of the hinges 10 and 11 are rigidly attached to the fixed support 30 along respective surfaces C and E, any independent movement of the second ends 12 and 14 of the hinges 10 and 11 may occur along an extent of the second ends and with an angle theta. Those skilled in the art will recognize that in an embodiment in which the hinges 10 and 11 comprise rigid material, attachment of the second ends 12 and 14 to the movable support 31 would fixidly constrain the movable support 31 in free space. In the present invention, however, the hinges 10 and 11 comprise a sufficiently flexible material such that application of a force to the movable support 31 will result in a constrained rotation of the second ends 12 and 14 and, thus, the movable support 31 about a pivot axis passing generally through a region P. The pivot axis is generally defined by a flexure point of the hinges 10 and 11 and corresponds to the center of the "X" shape described in FIG. 7c. In an exemplary embodiment, the hinges 10, 11, 23, and 24 are rigid enough such that the arm 371 rotates without excessive up, down, or torsional motion and yet are flexible enough that the arm 371 rotates without excessive disturbances through its +/–3.5 degree range of angular motion. In the preferred embodiment, the hinges 10, 11, 23, and 24 comprise a single layer 0.0015 inch thick stainless steel material. In an alternative embodiment, the hinges 10, 11, 23, and 24 may comprise a 0.001 inch layer stainless steel layer, a 0.001 inch viscoelastic layer, and a 0.001 inch plastic layer. Also, the hinges 10, 11, 23, and 24 preferably do not exhibit undesirable resonance over the desired operating bandwidth of the first actuator 333. The aforementioned discussion of FIG. 3 is understood to also apply to hinges 23 and 24.

When current is applied to coil 900, the combination of upper cross-hinges 9 and lower cross-hinges 22 act to center the rotational movement of the arm 371 (i.e., direction A) and thus the movable support 31 (i.e., direction W) parallel to a plane passing between the magnets 70 and 80. In the present invention, although the movable support 31 rotates about the pivot axis within the region P with the angle theta, the flexure of the hinges 10 and 11 causes a translation of the pivot axis (i.e., in a direction T). Thus, the region P through which the pivot axis passes is defined by the flexure point of the cross hinges 9 and 22 as well as the extent of translational motion T.

Those skilled in the art will recognize that the cross-hinges 9 and 22 of the first actuator 333 are advantageous over prior art bearings as no frictional forces exist between bearing surfaces. In the present invention, the hinges 10, 11, 23, and 24 exhibit hysteresis effects. However, in the present invention, the hysteresis effects are preferably smaller than the frictional forces of the prior art. The reduced frictional forces of the present invention result in a reduced current as compared to the prior art current required to impart movement with a given force to the arm 371. Furthermore, for a required given force, the coil 900 may be made smaller than the prior art. A smaller coil reduces the mass such that rotation may occur about the pivot axis with an increased speed and improved operating bandwidth. Also, in the present invention, the cross hinges 9 and 22 are not limited by a minimum size as are commercially available bearings, and, therefore, the first actuator 333 of the present invention may be made with a smaller form factor than the prior art. While implementation of a set of hinges 10, 11, 23, and 24 has been described in a voice coil motor embodiment, it is understood that the hinges 10, 11, 23, and 24 could also be used in other types of actuators to effect other types of displacements, for example mechanical displacements and the like and, therefore, the hinges 10, 11, 23, and 24 of the present invention should be limited only by the scope of the following claims.

Figure 9:
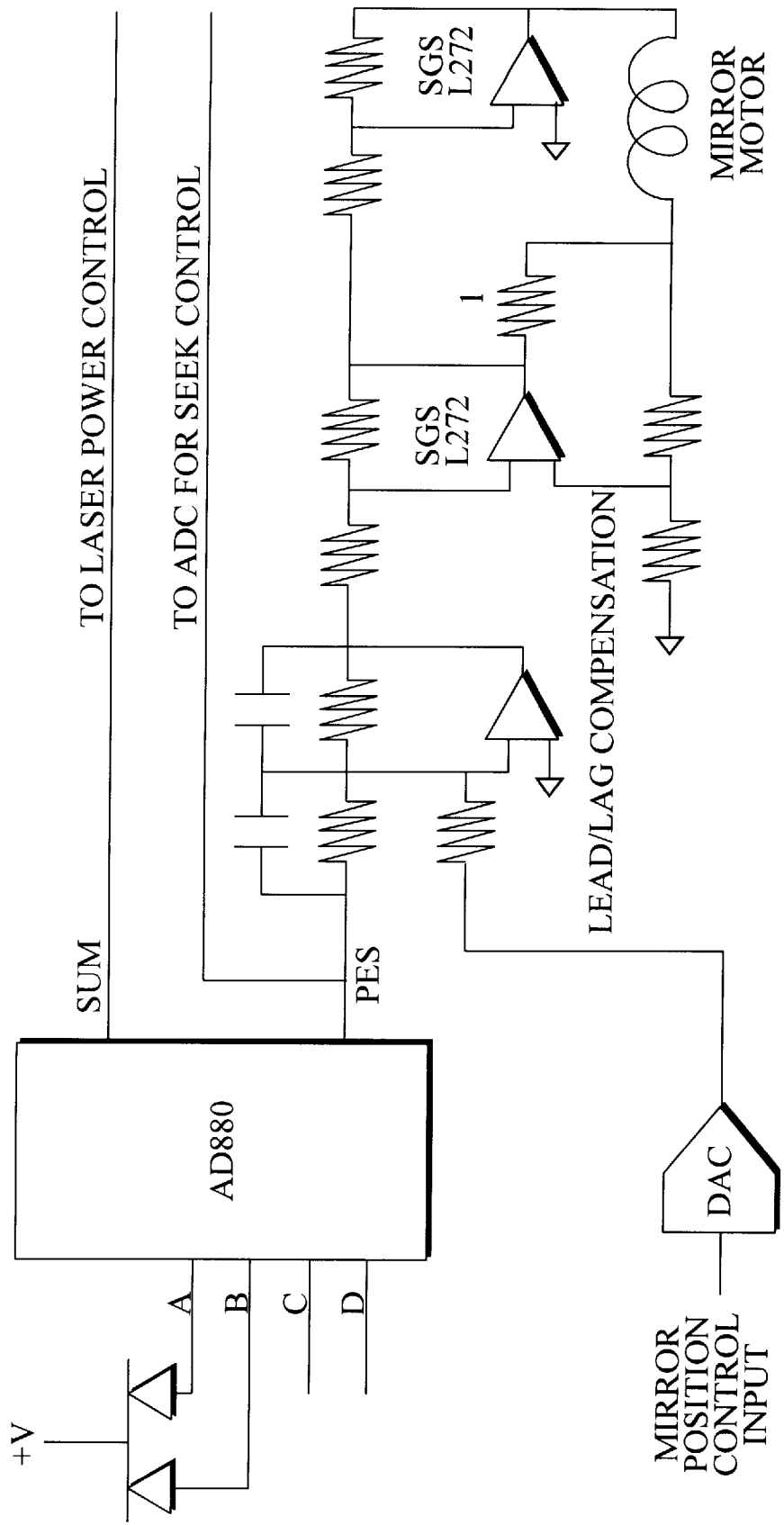
FIG. 9 illustrates a servo circuit.

Referring back to FIGS. 3a–e, in the preferred embodiment, the first detector 358 is disposed in the optical path traversed by the third beam 191c (in direction 356) such that positional output signal provided by the first detector 358 corresponds to positional displacement of the outgoing laser beam 191 by the arm 371. The first detector 358 comprises a position sensing detector (PSD) of a variety well known in the art. In an exemplary embodiment, the first detector 358 comprises a one-dimensional 1×7 mm PSD manufactured by Hamamatsu Photonics K.K, Hamamatsu City, Japan that exhibits operating characteristics that are similar to Hamamatsu PSD model no. S3931. As described in an exemplary method of use in further detail below, displacement of the first beam 191a across the array of lenses 476 also corresponds to positional displacement of the outgoing laser beam 191 by the arm 371. Positional output signals provided by the first detector 358 can, thus, be used to ascertain the position of first beam 191a with respect to a particular lens 476. In the preferred embodiment, the positional output signals provided by the first detector 358 are used with a feedback servo circuit (e.g., illustrated in FIG. 9 as an AD880 manufactured by Analog Devices, Norwood, Mass.) to provide an input signal to the coil 900 of the first actuator 333 and, thus, to controllably direct the first beam 191a (in one-dimension) towards a desired optical fiber 302.

Referring back to FIGS. 3a–e again, in the preferred embodiment, the second actuator 334 comprises a two stage voice-coil motor (VCM) of a variety well known in the art. In an exemplary embodiment, the redirection lens 311 is coupled to the second actuator 334 using well known optical mounting techniques such that 0–350 um of motion can be imparted by the second actuator 334 to the redirection lens 311 in one or both of the indicated directions 356, 379.

In the preferred embodiment, the redirection lens 311 receives the first beam 191a, and the second actuator 334 controllably directs the first beam 191a (in two dimensions) towards a particular lens 476 and, thus, towards a desired optical fiber 302. In the preferred embodiment, the redirection lens 311 also receives the second beam 191b and directs the second beam 191b towards the second detector 359. As described in an exemplary method of use in further detail below, displacement of the first beam 191a across the array of lenses 476 also corresponds to positional displacement of the second beam 191b by the second actuator 334. Positional output signals provided by the second detector 359 can, thus, also be used to ascertain the position of first beam 191a with respect to a particular lens 476. In the preferred embodiment, the positional output signals provided by the second detector 359 are used with a feedback servo circuit (e.g., illustrated in FIG. 11 as an AD880 manufactured by Analog Devices, Norwood, Mass.) to provide an input signal to the second actuator 334 and, thus, to controllably direct the first beam 191a (in two-dimension) towards a desired optical fiber 302.

In the exemplary embodiment, the second actuator 334 operates with an open loop compensated crossover frequency of approximately 1.5 Khz and is capable of 100 g's of acceleration. In the aforementioned embodiment, the resulting performance characteristics are desired: 59 um of displacement of the first beam 191a across a particular lens 476, 56 um of displacement of the first beam 191a across a proximal end of the optical fibers 302, and 150 um displacement of the second beam 191b across the second detector 359, per 1000 um of linear displacement of the redirection lens 311 by the second actuator 334. One benefit derived from use of the redirection lens 311 with the second actuator 334 in the optical path of the outgoing beam 191 is that reduced mechanical tolerances are possible for achieving alignment of the outgoing laser beam 191 onto a particular lens 476.

Figure 8:
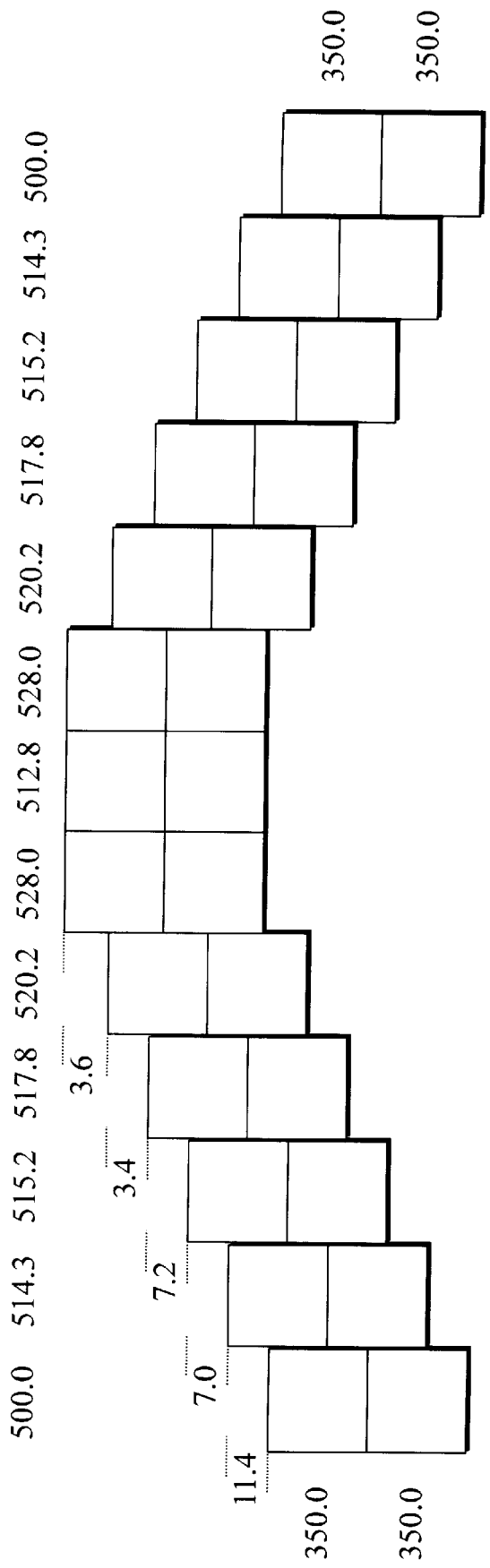
FIG. 8 illustrates an exemplary geometry of a second detector.

Referring now to FIG. 8, there is seen an exemplary geometry of the second detector. In the preferred embodiment, the second detector 359 comprises a quad photo-detector array. As illustrated in dimensional detail in FIG. 8, the second detector 359 comprises a plurality of photo-detector pairs that are alternatively and adjacently disposed along a generally semicircular arc. Those skilled in the art will recognize that the measurement surfaces of adjacent photo-detector pairs can be used with well known quad array detection techniques to detect and measure the position of the second beam 191b across the measurement surfaces.

Figure 10:
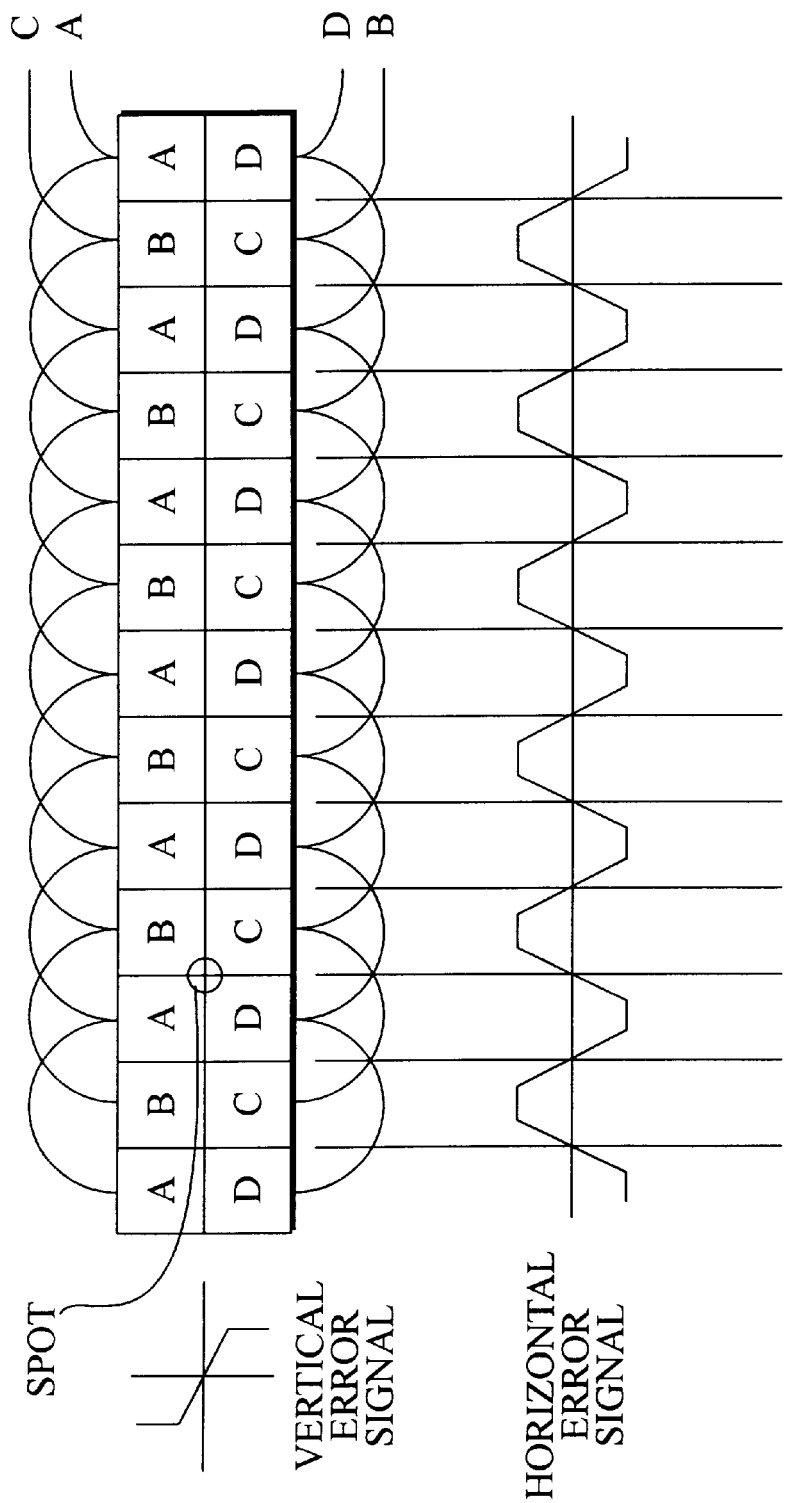
FIG. 10 illustrates outputs of A-D photo-detectors.
Figure 11:
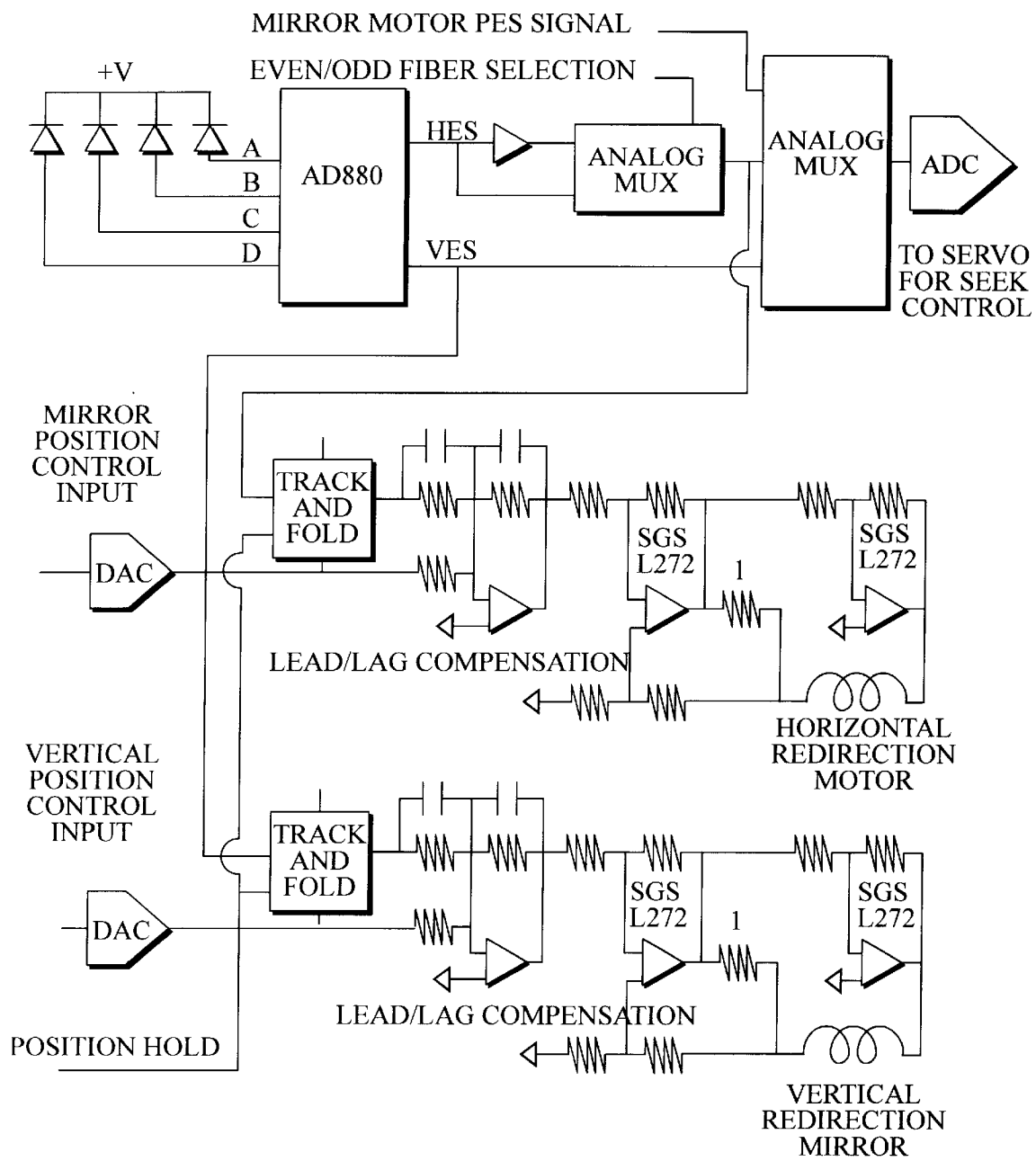
FIG. 11 illustrates connections between the A-D photo-detectors and the servo circuit.

FIG. 10 illustrates outputs of A-D photo-detectors and their connections to the servo circuit illustrated in FIG. 11. The servo circuit utilizes A-D photodetector outputs to provide the second actuator 334 with vertical and horizontal error signals for positioning of the redirection lens 311. In the preferred embodiment, the semicircular arc along which the A-D photo-detectors are disposed is a function of the location where the second beam 191b is deflected through the redirection lens 311 by the first and second actuators 333, 334. Those skilled in the art will recognize that the shape of the semicircular arc depends on various parameters, including: the size of the redirection lens 311, the distance between the lenses 476, the distance between the redirection lens 311 and the second detector 359, and the desired performance characteristics. In an exemplary embodiment, the second detector 359 is disposed in the optical path of the first beam 191a such that 100 um displacement of the second beam 191b across the second detector 359 corresponds to 33 um of displacement of the first beam 191a across a particular proximal end of the optical fibers 302.

Those skilled in the art will recognize that at higher operating frequencies (i.e., higher switching speeds of the optical switch 104) the servo circuitry and, thus, the first and second detectors 358, 359 will exhibit a concomitant increase in output noise, which will act to decrease the positional accuracy with which the first beam 191a may be directed towards the optical fibers 302. It is also understood that other sources of high frequency noise may also be present, for example, noise resulting from shock, vibration, optical, and/or thermal effects. The positional accuracy with which the first beam 191a may be directed is a function of the positional output signal SNR provided by the first and second detectors 358, 359. Because the output signals provided by the first detector 358 are obtained across a wider measurement surface than from the second detector 359 and because a 0.5 um positional accuracy of the first beam 191a onto a particular lens 476 is desired from both the first and second actuators 333, 334, a given amount of output noise will comprise a larger percentage of the positional output signal provided by the first detector 358 than the second detector 359. In the preferred embodiment, the SNR of positional output signal from the first detector 358 may be increased by passing the signal through a lowpass filter to effectively reduce the high frequency noise components resulting from, for example: the servo circuit itself, shock, vibration, optical, and/or thermal effects. However, those skilled in the art will recognize that reduction in high frequency noise may result in a decrease in the operating bandwidth over which the first actuator 333 can be used to deflect the outgoing laser beam 191.

The present invention overcomes this limitation by using the relatively low-bandwidth first actuator 333 for coarse optical positioning the first beam 191a over a wide surface area (i.e., the entire array of lenses 476) in conjunction with the relatively hi-bandwidth second actuator 334 for fine optical positioning of the first beam 191a over a relatively narrow surface area (i.e., a particular lens 476). The use of a hi/low bandwidth actuator combination preferably eliminates the need for very expensive low/noise/high-frequency servo electronics that would be required when using a single actuator for fast and precise optical switching of light between the input port 181 and the output ports 182.

In an exemplary embodiment, switching the first beam 191a between the optical fibers is made up of a two stage process: 1) positioning the first beam 191a between lenses 476 using the first actuator 333 with a settling accuracy of about 1 um and within about 3 ms; and 2) fine positioning the first beam 191a to a new position over a particular optical fiber 302 within about 1 ms. In the aforementioned process, the open loop acceleration portion of the second actuator 334 preferably overlaps the motion of the first actuator 333 to reduce the amount of motion required by the second actuator 334.

Figure 12:
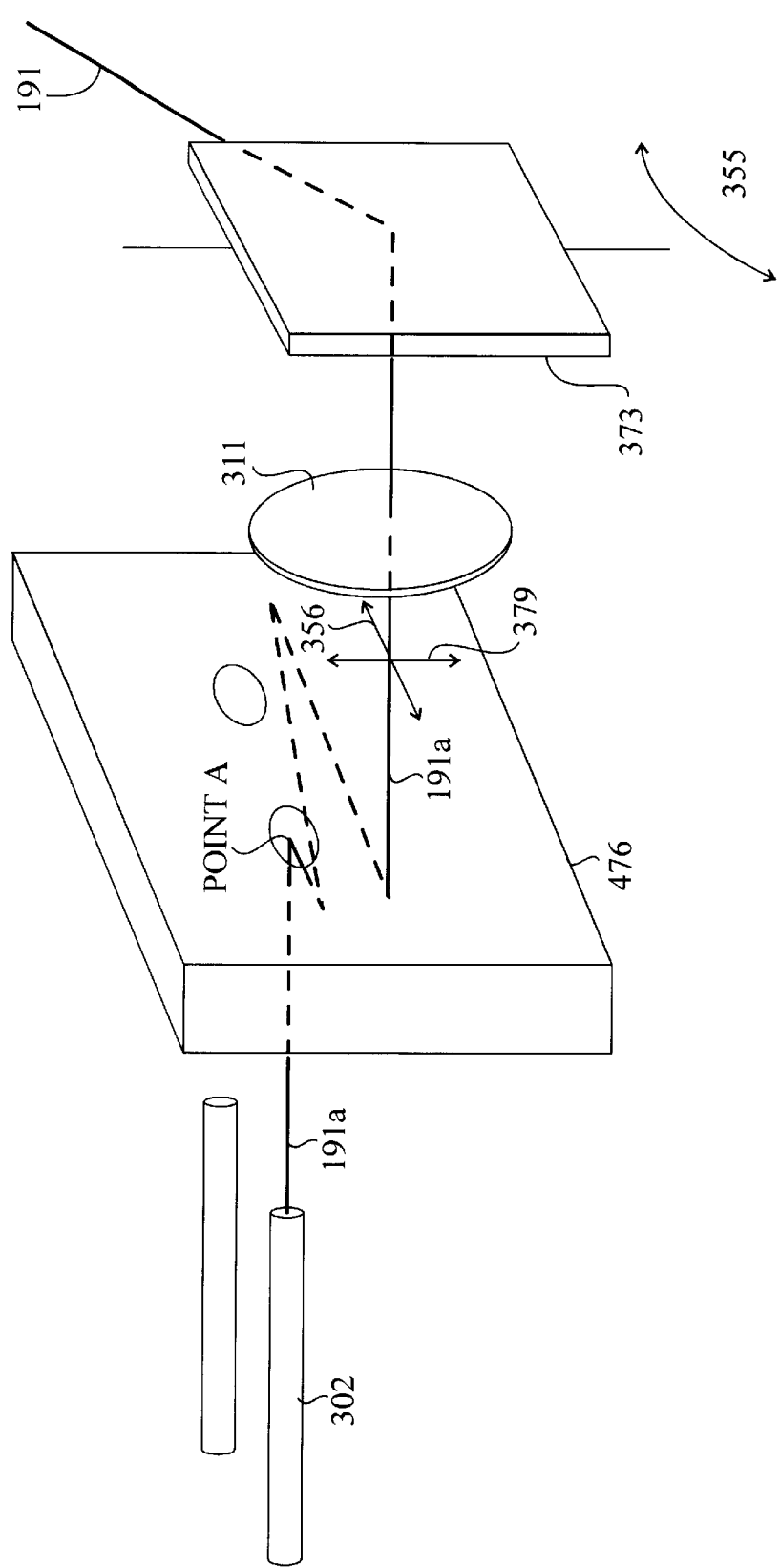
FIG. 12, illustrates an exemplary embodiment of pre/post-calibration of the optical switch.

Referring now to FIG. 12, an exemplary embodiment of pre/post-calibration of the optical switch 104 is illustrated and is described as follows. Initially, the first actuator 333 (FIGS. 3a–3e) positions the reflector 373 towards one extreme of the rotation indicated as 355 to reflect the outgoing laser beam 191, and the second actuator 334 (FIGS. 3a–3e) positions the redirection lens 311 towards one extreme in the direction indicated as 356 and towards a second extreme in the direction indicated as 359. The first beam 191a is thus directed towards the array of lenses 476, however, the first beam 191a is at this point not necessarily optimally focused by a particular lens 476 towards a particular optical fiber 302. Next, the reflector 373 is scanned in the direction 355 until a first increase in the amplitude of the reflected laser beam 192 (FIG. 5) is detected. If after rotation in the direction 355 an increase in the amplitude of the reflected laser beam 192 is not detected, the reflector 373 is again positioned towards one extreme of the rotation 355 and the second actuator 334 is incremented in the vertical direction 356 and the reflector 373 is then again scanned in the direction 355. The aforementioned process is repeated until a first increase in amplitude in the reflected laser beam 192 is detected (Point A). At point A, the second actuator 334 is alternatively incremented horizontally and vertically in the directions 356 and 379 until a maximum amplitude of the reflected laser beam 192 is obtained. A maximal value preferably corresponds to optimal alignment of the first beam 191a over the optical axis of a first of the array of lenses 476. As previously described above, point A will thus correspond to values measured by the first and second detectors 358, 359 (FIG. 3e). These values are stored for subsequent positioning of the first beam 191a towards the first lens of the array of lenses 476 (only two lenses shown).

The position over the lens is maintained utilizing the first and second actuators 333, 334 and their respective servo-circuits. Those skilled in the art will recognize that, as previously described, the position of any remaining lenses 476 can also be determined through appropriate scanning in the directions 355, 356, and 379 while monitoring the reflected laser beam 192 for respective increases in amplitudes. The output values measured by the first and second detectors 358 and 359 at the respective maximum amplitudes of the reflected laser beam 192 can, thus, be used to preferably position the first beam 191a towards any one of the array of lenses 476 and, thus, towards any one of the optical fibers 302. The calibration sequence described above can be utilized to adjust for subsequent misalignments resulting from, for example, shocks and temperature. Those skilled in the art will also recognize that the method of use described above should not limit the present invention, as other methods of use are also within the scope of the invention, which should be limited only by the scope of the ensuing claims.

Figure 13A:
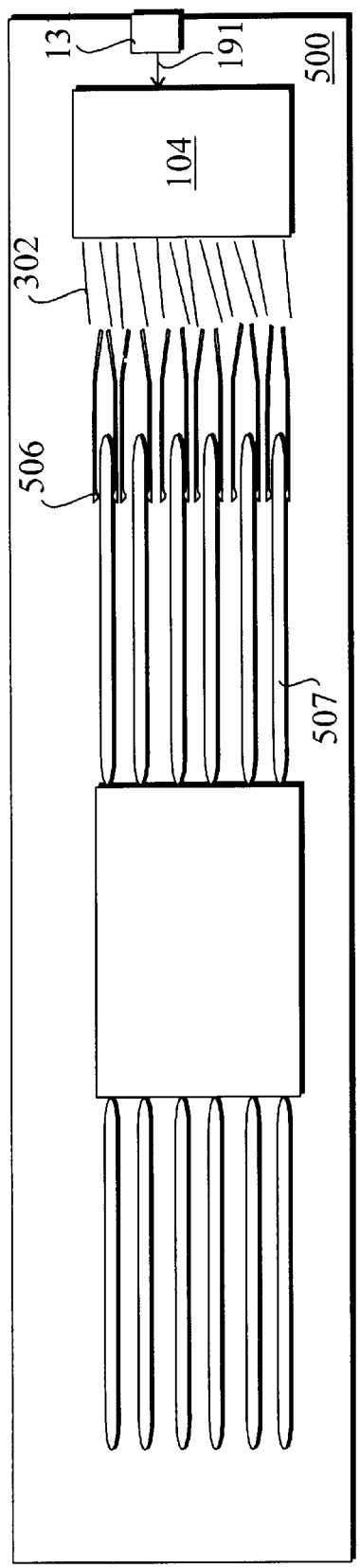
FIGS. 13a–b illustrate two embodiments of a magneto-optical disk drive.

Referring now to FIG. 13a, an embodiment of a magneto-optical disk drive is illustrated. In an exemplary embodiment, the magneto-optical (MO) data storage and retrieval system 500 comprises an industry standard 5.25 inch half-height form factor (1.625 inch) within which are disposed at least six double-sided MO disks 507 and at least twelve flying MO heads 506. The flying MO heads 506 are manufactured to include 12 optical fibers 302 as part of a very small mass and low profile high NA optical system so as to enable utilization of multiple MO disks 507 at a very close spacing within the system 500 and; therefore, to comprise a higher areal and volumetric and storage capacity than is permitted in an equivalent volume of the prior art. In the preferred embodiment, a spacing between each of the at least six MO disks 507 is reduced to at least 0.182 inches. High speed optical switching between the laser source 131 and the MO disks 507 is provided by the optical switch 104 and the first actuator 333 contained therein.

In the present invention, when the outgoing laser beam 191 is aligned over a particular lens 476, the output port 182 from which the outgoing laser beam 191 exits towards a particular MO disk 107 may be identified by a sensing a signal from outputs of the corresponding A-D photo-detectors of the second detector 359, for example, a maximum in a summed signal of the outputs of a particular set of A-D photo-detectors. The signals from the sensing circuit may be used subsequently to identify which of the set of MO disks 107 is being read or written at any given time. This compares to the prior art that requires MO disks be identified by data marks written to the MO disks.

Figure 13B:
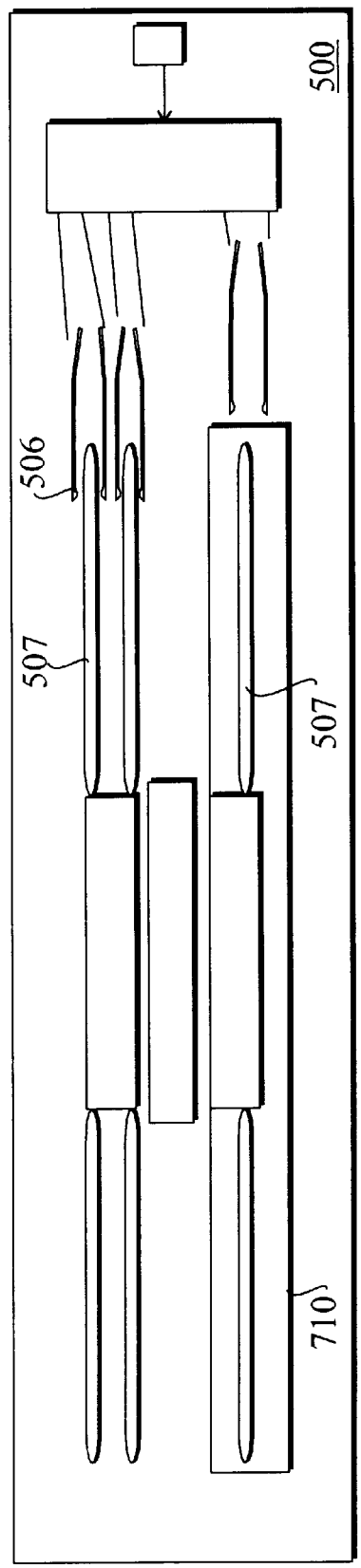

In an alternative embodiment shown in FIG. 13b, the system 500 may include a removable MO disk cartridge portion 710 and two fixed internal MO disks 507. By providing the removable MO disk cartridge portion 710, the fixed internal and removable combination permits external information to be efficiently delivered to the system 500 for subsequent transfer to the internal MO disks 507. The copied information may, subsequently, be recorded back onto the removable MO disk cartridge portion 710 for distribution to other computer systems. In addition, the removable MO disk cartridge portion 710 allows for very convenient and high speed back-up storage of the internal MO spinning disks 507. The fixed internal and removable combination also permits storage of data files on the removable MO disk cartridge portion 710 and system files and software applications on the internal MO spinning disks 507. In another alternative embodiment (not shown) system 500 may include: any number (including zero) of internal MO disks 507 and/or any number of MO disks 507 within any number of removable MO disk cartridge portions 710.

While the present invention is described as being used in an MO disk drive system 500, the optical switch 104 and the first actuator 333 contained therein may be used in many different environments and many different embodiments, for example, with first and second actuators other than voice-coil motor actuators, with other form factors, with other optical sources of light, with other types of optical fibers, and/or with other types of optical elements. The optical switch 104 is also applicable to information transfer using other head technologies, for example, optical heads in compact disks (CD) and digital video disks (DVD). The optical switch 104 of the present invention can also be used for optical switching of light in other optical communications applications, e.g., fiber optic communications.

Thus, the present invention has been described herein with reference to particular embodiments thereof, a latitude of modification, various changes and substitutions are intended in the foregoing disclosure and it will be appreciated that in some instances some features of the invention will be employed without a corresponding use of other features without departure from the scope of the invention as set forth.

What is claimed:

1. A method of deflecting a beam of light between an input and an output of an optical switch comprising the steps of coarsely directing said beam of light in response to low frequency control signals and finely directing said beam of light in response to high frequency control signals.

2. The method of deflecting a beam of light as recited in claim 1 wherein said coarsely directing step occurs prior to said finely directing step.

3. An optical switch for deflecting a beam of light between an input and an output of the optical switch in response to low frequency and high frequency control signals, comprising a first beam deflector disposed in an optical path of said beam of light between said input and said output for coarsely directing the beam of light in response to the low frequency control signals and a second beam deflector disposed in said optical path of said beam of light between said input and said output for finely directing the beam of light in response to the high frequency control signals.

4. The optical switch as recited in claim 1, wherein said first beam deflector comprises a voice coil motor.

5. The optical switch as recited in claim 4, wherein said first beam deflector directs said beam of light towards said second beam deflector in one dimension.

6. The optical switch as recited in claim 4, wherein said first beam deflector comprises a rotary arm and a reflector coupled to said arm for directing said beam of light.

7. The optical switch as recited in claim 1, further comprising a position sensing detector for sensing a position of a portion of said beam of light and controlling the direction of said beam of light by said first beam deflector as a function of said sensed position of said portion of said beam of light.

8. The optical switch as recited in claim 1, wherein said second beam deflector comprises a two-stage voice coil motor.

9. The optical switch as recited in claim 1, wherein said second beam deflector directs said beam of light in two dimensions.

10. The optical switch as recited in claim 1, wherein said second beam deflector comprises a directing lens for directing said beam of light.

11. The optical switch as recited in claim 10, further comprising a quad detector array for sensing a position of a portion of said beam of light and controlling the direction of said beam of light by said second beam deflector as a function of said sensed position of said portion of said beam of light.

12. The optical switch as recited in claim 1, further comprising an array of lenses in the vicinity of said output, said first and said second beam deflectors selectively directing said beam of light towards said array of lenses.

13. The optical switch as recited in claim 12, wherein said array of lenses comprises a linear array of adjacent lenses.

14. An optical storage drive, comprising a disk having an optical storage location and an optical switch for deflecting a beam of light between an input and an output of the optical switch, said optical switch having a first beam deflector disposed in an optical path of said bean of light between said input and said output for coarsely directing the beam of light in response to low frequency control signals and a second beam deflector disposed in said optical path of said beam of light between said input and said output for finely directing the beam of light in response to high frequency control signals.

15. The storage drive as recited in claim 14, wherein said output comprises optical fibers for directing said beam of light towards said optical storage location.

16. The storage drive as recited in claim 14, wherein said second beam deflector is disposed in said optical path between said first beam deflector and said output.

17. The storage drive as recited in claim 16, wherein said first and second beam deflectors each include a voice-coil motor.

18. An optical switch for deflecting a beam of light extending along an optical path in response to low frequency and high frequency control signals, comprising a first deflector disposed in the optical path for coarsely directing the beam of light in response to the low frequency control signals and a second deflector disposed in the optical path of the coarsely directed beam of light for finely directing the beam of light in response to the high frequency control signals.

19. The optical switch as recited in claim 18, wherein the first deflector includes a first actuator and a reflector coupled to the first actuator for directing the beam of light.

20. The optical switch as recited in claim 19, wherein the first actuator is a rotary actuator.

21. The optical switch as recited in claim 19, wherein the second deflector includes a second actuator and a lens coupled to the second actuator for directing the beam of light.

* * * * *